US012671585B2

(12) United States Patent
Andon

(10) Patent No.: US 12,671,585 B2
(45) Date of Patent: Jun. 30, 2026

(54) SYSTEMS AND METHODS FOR GOVERNING USE RIGHTS OF DIGITAL ASSETS ACROSS HETEROGENEOUS VIRTUAL PLATFORMS

(71) Applicant: NIKE, Inc., Beaverton, OR (US)

(72) Inventor: Christopher Andon, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 125 days.

(21) Appl. No.: 18/581,363

(22) Filed: Feb. 19, 2024

(65) Prior Publication Data

US 2024/0195627 A1      Jun. 13, 2024

Related U.S. Application Data

(60) Provisional application No. 63/619,225, filed on Jan. 9, 2024.

(51) Int. Cl.
*H04L 9/32* (2006.01)
(52) U.S. Cl.
CPC ................................. *H04L 9/3213* (2013.01)
(58) Field of Classification Search
None
See application file for complete search history.

(56) References Cited

U.S. PATENT DOCUMENTS

2010/0057573 A1*  3/2010  Singhal .............. G06Q 30/0267
                                                              705/14.64
2019/0205881 A1*  7/2019  Borzilleri ............. G06Q 30/018

| | | | | |
|---|---|---|---|---|
| 2020/0005284 | A1* | 1/2020 | Vijayan | G06Q 20/065 |
| 2021/0266321 | A1* | 8/2021 | Ruff | H04W 12/084 |
| 2021/0279695 | A1* | 9/2021 | Rice | G06Q 20/12 |
| 2022/0006642 | A1* | 1/2022 | Maj | H04L 9/3239 |
| 2022/0016529 | A1* | 1/2022 | Meilich | H04L 63/123 |
| 2022/0075845 | A1* | 3/2022 | Bowen | G06F 30/30 |
| 2022/0294630 | A1* | 9/2022 | Collen | H04L 9/0894 |
| 2022/0351187 | A1* | 11/2022 | Kim | G06Q 20/3276 |
| 2022/0358186 | A1* | 11/2022 | Deuel | G06Q 40/04 |
| 2023/0108610 | A1 | 4/2023 | Tang et al. | |
| 2023/0186299 | A1* | 6/2023 | Huggins | H04L 63/105 |
| | | | | 705/44 |
| 2023/0259923 | A1 | 8/2023 | Conley et al. | |

FOREIGN PATENT DOCUMENTS

WO      WO-2023201167 A2 *  10/2023  ............. H04L 65/61

* cited by examiner

*Primary Examiner* — Kaveh Abrishamkar
(74) *Attorney, Agent, or Firm* — Quinn IP Law

(57)      ABSTRACT

Presented are computing systems for transferring digital assets between virtual platforms, methods for making/using such systems, and digital assets imported/exported by such systems. A method for controlling transfer of digital assets includes storing a fungible digital asset on a digital platform in association with a personal account of a user. A server computer of the digital platform receives a user request to transfer the fungible digital asset to another digital platform; in response, the fungible digital asset is converted to a non-fungible digital asset by generating a cryptographic (crypto) token, assigning the crypto token to the digital asset, and recording the crypto token on a blockchain ledger. The newly minted digital asset is transferred to an intermediate computing node and associated with another personal account of the user. The non-fungible digital asset is then transferred to the requested digital platform and associated with yet another personal account of the user.

20 Claims, 9 Drawing Sheets

SYSTEMS AND METHODS FOR GOVERNING USE RIGHTS OF DIGITAL ASSETS ACROSS HETEROGENEOUS VIRTUAL PLATFORMS

CROSS REFERENCE TO RELATED APPLICATIONS

The present disclosure claims the benefit of priority from U.S. Provisional Patent No. 63/619,225, filed on 9 Jan. 2024, which is incorporated by reference in its entirety.

TECHNICAL FIELD

Aspects of this disclosure relate to computing systems and logic for governing use rights of digital assets across different platforms, including decentralized and centralized computing environments.

BACKGROUND

The internet has evolved rapidly over the past decades, transitioning through different phases enabled by emerging technologies. Where we stand now is often referred to as the Web2.0 era of the internet. Web2.0 platforms and services are characterized by high centralization and generally closed ecosystems, many of which have exploded in popularity with user generated content, social media, and online gaming applications. A few major technology corporations tend to wield enormous power, controlling massive networks as well as the data of billions of users. These major networks often serve as walled gardens that can operate as gatekeepers while dictating the terms of engagement for users and developers alike.

The core architecture of Web2.0 follows the traditional client-server model, with a centralized server (owned or leased on the cloud) delivering content and services to users. This architecture concentrates data and control in the hands of the platform owners, while the users have little ownership and control. In a video game context, acquired in-game digital assets are often confined to one particular game or developer platform, and the user has little or no ability to export, trade, or take with them that which they have earned or purchased while playing.

In contrast to this centralized Web2.0 architecture is the notion of decentralized control and ownership, which is the premise of what is being referred to as "Web3.0." More specifically, the Web3.0 architecture aims to decentralize power and asset ownership through the user of public blockchain technologies, user marketplaces, and decentralized protocols. By building on public blockchains and peer-to-peer networks, Web3.0 technology allows the creation of decentralized apps and services that no single entity controls. This shifts power from centralized technology company intermediaries to users of technology products and services. Associated concepts like self-sovereign identity and decentralized autonomous organizations (DAOs) further reinforce the concepts of user-control, ownership, and transparency.

One early use of the Web3.0 architecture/technology has been in uniquely registering digital collectables or other creative works via unique "tokens" that are registered to the blockchain. A non-fungible token (NFT), as the name implies, is a unique and non-interchangeable digital asset that is recorded on a blockchain ("tokenized") and is often-times designed to be resold or traded between different market participants. NFTs are functionally maintained in digital wallets that are typically controlled by the consumer either directly or via a third-party custodial service. This digital wallet provides the consumer with exclusive ownership/possession of the asset in a very analogous manner as having physical possession of a real-world object.

NFTs may take on different use cases, including certifying ownership of or licensed rights to use of related or linked asset(s) or content (e.g., music, art, media, avatars/characters, wearables, etc.). For instance, an NFT can serve as a digital certificate of authenticity and proof of ownership (or license rights) for a corresponding digital or physical good (or both when used in combination with NFC tags on physicals connected to/linked with NFTs) such as a pair of shoes or a digital representation of a pair of shoes. An NFT is a digital record with an encrypted identifier code that is recorded on an immutable digital ledger, such as a blockchain-style ledger, which can be broken up across many different nodes or ledger-maintaining participants. Such blockchain ledgers employ cryptographic hash functions (CHFs) to encode and map select portions of the NFT record while also referencing the prior block (in the chain of blocks) to provide continuity in a chain of possession. Blockchain technology with NFTs can therefore provide users with provenance and ownership/rights credentials, which can then be used to "unlock" access rights to associated licensed content and/or experiences.

NFTs are digital identifiers that can include elements, such as identifier information (public and private keys), a connection to a blockchain computer programming "smart contract" that assigns NFT ownership to a first owner (via "minting") and governs the process for the NFT's ownership transfer, use, activation/deactivation, and properties, and metadata. Metadata for a basic profile picture (PFP) NFT, for example, may contain a title, a description, creator attribution, blockchain details such as links to the "smart contract" address, token ID, token standard (e.g., ERC-721 or ERC-1155) chain information (e.g., Ethereum, Polygon, etc.) date of last update, secondary royalty rates (e.g. royalties due to the creator/IP owner for obtaining license rights to related content based on NFT ownership) and functional link(s) (e.g., a Universal Resource Identifier (URI)) to a digital image, license/legal agreement, etc. stored on centralized (e.g., AWS instances managed by a company) or decentralized servers (e.g., IPFS storage on the blockchain)) Due to complexities associated with pushing large amounts of data through a blockchain's transaction validation process, as noted above, the metadata of an NFT may often include a pointer or reference to separate on-chain or off-chain data/digital files, such as licensed related content including photos, graphics, videos, and/or audio content. When digital content associated with an NFT is displayed, such as on a user's social media account or in a user's digital wallet, an associated software program may review the metadata and digitally retrieve the associated photo from the referenced file repository for display. For the purposes of this disclosure, the term "NFT" is intended to refer to any tokenized and/or blockchain-recorded digital collectable or blockchain-recorded digital asset, and in particular those which are created under the Ethereum Request for Comments (ERC) 721 or ERC-1155 protocols, or any similar protocols built upon the Ethereum, Polygon, Solana, Bitcoin, or other networks. The terms blockchain-recorded and blockchain-based can be used interchangeably.

Many existing Web2.0 companies have been reluctant to embrace the use of truly portable NFTs and other Web3.0 digital assets both for logistical and for economic reasons. On the logistical front, because NFTs are commonly transferable between digital wallets, there may bee a need to query the blockchain before every use of the asset to ensure that the purported owner is still in recorded possession of that token. This querying takes time, which can negatively impact the user experience, and assumes that transfers are immediately queryable, which they often are not. Further, if NFTs or their associated data files need to be moved or downloaded, time and money may both be required from the company or user—again, impacting the user experience. Finally, many Web2.0 companies have concerns over interoperability, when their software continuously evolves, yet tokenized assets are somewhat frozen in time. On the economic side of things, with non-transferable digital assets locked into walled platforms, platform technology companies have full control, whereas with blockchain-based digital assets, license rights from creatives/creative companies and digital asset portability across platforms and versions of experiences could have impacts that drastically change the economics of the technology platform's business.

As an example, in a traditional video game, if a console system were to permit the use of in-game NFTs, the console or video game service would need to periodically query the blockchain to ensure that the digital asset is still in the user's possession (i.e., as opposed to having been transferred or sold on a marketplace). This repeated querying could become burdensome to the network and could negatively affect the user's gaming experience. Additionally, many Web3.0 digital assets may not be optimized for in-game usage, particularly for games released after the first sale of the NFT, which may also negatively impact the user experience. Finally, under current technologies, there would be nothing stopping a user from importing the same Web3.0 digital asset into multiple games/environments simultaneously, thus compromising the uniqueness of the asset. In all these scenarios, solutions need to be created to address creative content licensing along with technology for connecting users, accounts, platforms, and digital assets.

SUMMARY

Discussed below are systems and methods for enabling consumers/users to bridge the Web2.0 and Web3.0 internet worlds particularly in connection with digital collectables and/or virtual goods. These systems and methods enable users to benefit from open marketplaces, portability of assets, and guaranteed exclusivity, while simultaneously removing the need for repeated blockchain queries and time-consuming file transfers and addressing a myriad of compliance complications. In some embodiments, the present disclosure details a Web2.5 intermediary system that can serve to bridge user access to creative digital assets across both open-platform Web3.0 environmenets and more closed off Web2.0 environments that favor stability and speed over openness.

For the purpose of this disclosure, Web3.0 digital assets may be interchangeably referred to as blockchain-recorded or blockchain-based digital assets, cryptographic digital assets, tokenized digital assets, or simply NFTs. Regardless of whether they are recorded to public blockchains or private blockchains or other similar distributed ledger technologies, these Web3.0 digital assets remain the exclusive property of the end user/customer (commonly also including licensed rights to creative content associated with the "token" or digital asset.) Conversely, Web2.0 digital assets (commonly locked in a walled garden digital platform) may be interchangeably referred to as virtual goods (VGOOD), or non-blockchain digital assets. Each of the different Web2.0 and Web3.0 terms may be used to refer to a common "digital asset" or "digital collectable" though may differ in the form in which that digital asset is registered/recorded.

Enabling consumer-selected interoperability with both Web2.0 and Web3.0 ecosystems in the manner described herein may help to increase consumer choice, including user access to secondary marketplaces of digital assets. Disclosed features may also enable easier integration of users with Web2.0 video games, to to unlock corresponding virtual goods within a third-party gaming environment, and without the need for a digital wallet or a connection of a digital wallet to retrieve/unlock an NFT.

In a general sense, the present system may comprise an intermediary "host" system/platform that maintains a plurality of member accounts within a software environment. When a user corresponding to one of those member accounts wants to import an NFT into the software environment, the system may receive and immediately burn or otherwise sideline the NFT. Concurrently with NFT transfer from the user, the system may create a corresponding Web2.0 virtual good and associate that virtual good with the user's member account. If the user wishes to withdraw the virtual good from the software environment (e.g., to transact the digital asset on an open marketplace as an NFT), the virtual good may be minted or otherwise returned to the user in the form of an NFT, while the corresponding Web2.0 virtual good is concurrently deleted from the user's member account.

While the present technology enables the consumer to choose, move between, and/or interact with the Web2.0 and Web3.0 ecosystems, in some embodiments, it may be important for the Web2.5 server (i.e., the "host platform") to not take actual possession of a user's NFT through custodial control (i.e., via holding the NFT on the consumer's behalf or by having direct access to a consumer's private cryptographic key to a custodial wallet service provided.) By not being in custodial control or possession of the NFT, the intermediary company can reduce their custodial, compliance, and/or fiduciary risk, while also not needing to financially report the asset as a liability on the books.

Once the virtual good is created within the host platform and associated with a member account, the host platform may further be configured to facilitate use of that virtual good within participating video games, user experiences, or other 3rd party ("platform partner") applications. While in some embodiments, the host platform may fully transmit the virtual good and associated data files to the 3rd party, moving around a large data file associated with a virtual good, such as a three-dimensional (3D) virtual gaming skin model, is generally undesirable since different versions of the file may exist on different platforms, there is an inherent latency in any file transfer, and file transfers en masse may consume significant bandwidth for the parties involved. Rather than requiring platform-to-platform transfer of a virtual good's data file, in some embodiments, the digital asset may be encoded with access rights that may queried to unlock a related, though distinct to that virtual world, virtual good within the 3rd party's platform. To facilitate this unlock, the host platform may enable the consumer to associate a member account on the host platform with a virtual good file stored on a partner gaming platform. The consumer is enabled to unlock the virtual good file for use on the 3rd party gaming platform through the associated member account on the host platform. In this instance, the 3rd party gaming platform is prevented from accessing ("blinded to") the form of the asset as it exists on the host platform's site (whether user's base digital asset is in the form of a Web 3.0 NFT or a Web 2.0 VGOOD, for example).

In some non-limiting examples, a digital asset (or "object") may be representative of a physical good, a digital image or design rendering of a physical good, a digital collectable, a two-dimensional (2D) or three-dimensional (3D) design rendering or design file that may be suitable for future production, a virtual representation of an object that is not presently intended for physical creation/production, or any combination thereof. To further promote customer engagement and brand awareness, in some embodiments, the visual expression and other attributes of the digital asset may be altered or alterable by a user, and the user may import and export digital assets (or rights to access such digital assets) across a myriad of heterogenous virtual platforms. For instance, the visual characteristics of a digital shoe or apparel may be adapted, or access right thereto unlocked, for transfer to and use in a virtual platform (VP), such as virtual reality (VR), augmented reality (AR), or video game (VG) context.

By way of example, and not limitation, there are presented cryptographic digital assets that are secured through a blockchain ledger of transaction blocks. These digital assets may function solely as a limited-release digital collectables or, if desired, to connect a real-world product, such as a physical shoe, to a digital collectible, such as a digital shoe. For instance, when a consumer buys a genuine pair of physical shoes—colloquially known as "kicks"—a digital representation of a shoe may be generated or retrieved, linked with the consumer, and minted a cryptographic token (e.g., an NFT). In this example, the digital shoe and cryptographic token may collectively represent a "digital collectible" and referred to as a "CryptoKick" (CRYPTO-KICKS®). The digital representation may include a 2D or 3D digital rendering, a computer-generated avatar, or an artist rendition of the shoe. The digital asset may be recorded as an NFT that is secured by an encryption-protected block containing a transaction timestamp, transaction data, and a hash pointer as a link to a previously recorded block (e.g., genesis block or prior transacted block) in a decentralized blockchain. Using the digital asset, the creator and/or owner is enabled to securely trade or sell the tangible pair of shoes, trade or sell the digital shoe, store the digital shoe in a cryptographic wallet or other digital blockchain locker, intermingle or alter the digital shoe, and/or have an intermingled/modified shoe custom made as a new, tangible pair of shoes (e.g., as limited by a predetermined rule set of acceptable shoe manufacturability defined by a manufacturer).

In another example, when a consumer buys a pair of physical or digital shoes, a digital representation of a shoe may be acquired from a database of existing digital representations of shoes, assigned/associated with a cryptographic token (e.g., an NFT), and combined with license rights to the digital representation, where the digital representation of the shoe and associated token with license rights may be collectively referred to as a "digital collectible". Alternatively, a digital collectible can be first sold to a consumer and a physical pair of shoes can thereafter be ordered and linked (via NFC chip or other connected/secure technologies) to the CryptoKick and thereby associated with the consumer/owner. The cryptographic digital asset may be 'secured' on a decentralized blockchain by an encryption-protected block that contains a transaction timestamp, transaction data, and a hash pointer as a link to a related block. Utilizing functionality or experiences involving the cryptographic digital asset, the owner can securely transfer, trade, or sell the tangible pair of shoes and/or the digital shoe(s), store the digital shoe(s) in a cryptographic wallet or other digital blockchain locker, and/or have the digital shoes custom made as a new, tangible pair of shoes as described herein.

Minting of a new cryptographic digital asset or unlocking of an existing cryptographic digital asset and a digital image/content associated with that digital asset may be activated in multiple ways. For example, when a person purchases a physical pair of shoes from a registered seller, a unique (e.g., 10-bit numeric) physical shoe identification (ID) code of the physical shoes may be linked to a unique (e.g., 42-bit alphanumeric) owner ID code of the buyer. An access prompt with a unique (e.g., 64-bit numeric) key may be concomitantly issued to a digital crypto wallet account associated with the owner ID code such that the buyer can retrieve a digital shoe with a cryptographic token; the key, token, and digital shoe are assigned to the owner ID code. For instance, a first Ethereum Request for Comments (ERC) 721 or ERC-1155 token may be granted to authenticate and transact a physical shoe, and a second ERC-721/ERC-1155 token may be granted to own, modify, and transact a digital shoe. Respective cryptographic tokens may be assigned to the physical shoes and to the cryptographic digital asset; alternatively, a single cryptographic token may be assigned to both the physical shoes and the digital asset. In addition to or as an alternative for requiring the purchase of a physical good, a cryptographic digital asset may be minted or unlocked in response to a user completing one or more predefined tasks, participating in one or more predefined events, achieving one or more predefined statuses, etc. In still other embodiments, the digital asset may be purchased directly from another user or from the issuing company.

A digital asset, in at least some applications, may contain attribute information that defines visual, audible, and/or other characterizing traits for that asset as well as certain use rights or conditions. The attribute information may represent content, size, color, style, fixity, reference, provenance, context, etc., of the digital asset, and may be coordinated according to predefined rules that govern altering of that digital asset. Use rights for a digital asset may depend on any one or more of: (1) a current or initial virtual environment and attendant effects; (2) an intended or future virtual environment and attendant effects; (3) time-dependent restrictions (e.g., can only use asset for 30 days or cannot alter asset after 30-day window); (4) creator-established restrictions (e.g., can only use asset on designated platform(s) or can only alter limited characteristics of asset); (5) destination-established restrictions (e.g., game creator limitations on asset type and/or asset alterations); (6) origination-established restrictions (preset maximum number of uses and/or alterations), etc. Some optional features may also include: consignment rule sets delineating the actions and services that may be taken/afforded by a third-party entity that holds but does not own a digital asset; destination rule sets delineating the ability of a desired destination platform to make/use/alter a digital asset; manufacturer's rule sets containing manufacturing restrictions that delineate options and allowable alterations to a digital asset; physical product rule sets delineating the ability of each successive owner of a digital asset to modify a digital asset based on an original, real-world good (e.g., via encryption key to the originally associated virtual product), etc.

Also discussed below are systems, methods, and logic for governing the manner in which a digital asset (or rights to access/use a digital asset) is selectively exported from an initial "origin" or "source" platform and imported into (or rights use unlocked within) a secondary "terminus" or "destination" platform. In one non-limiting example, a digital asset (e.g., non-tokenized virtual good (VGOOD)) is created on an origin (centralized) digital platform computing environment (e.g., as a recorded asset/ID) and assigned to an initial user or to a manager/owner of the origin (centralized) platform computing environment (e.g., creator or company). The initial user may request to execute a transfer (export) operation of the VGOOD digital asset from the origin centralized digital platform to a digital wallet of a destination (decentralized) digital platform computing environment via an NFT minted from a smart contract and recorded on the blockchain. For instance, the origin (centralized) digital platform may receive a request from the initial user to export the digital asset or to unlock access to the digital asset or a related asset on the destination platform. Upon receipt of this request, the origin (centralized) digital platform may responsively prompt the user to approve conversion of the asset or may automatically convert the asset without user approval.

To convert the asset, the origin (centralized) digital platform may initiate a smart contract to mint an NFT (recorded on a blockchain) with metadata associating the NFT with the digital asset and a set of digital license/use rights governing use of the asset (e.g., its content). Upon minting as an NFT to the user's designated digital wallet, the VGOOD on the origin centralized digital platform is deleted. If the initial user wishes to return the NFT to the origin centralized digital platform as a VGOOD, they can convert the digital asset back to a VGOOD assigned to their centralized platform account, e.g., by selecting to destroy the NFT (send the NFT to a burn wallet) or transferring the NFT (and therefore ownership of it, instead of managed custody of it) to a digital wallet managed by a representative of the origin (centralized) digital platform.

In another non-limiting example of governing use rights of digital assets across distinct virtual platforms and computing environments, a user may choose to request an unlock of access rights to a digital asset on a digital platform. In order to execute the user's request to unlock access rights on a digital platform a member account on the origin centralized digital platform can account link/connect with a member account on the digital platform the user desires to have access rights unlocked on. The origin centralized digital platform can determine the user has a right to a digital asset either via having a VGOOD in their member account or via a digital wallet check of ownership of an NFT, with the wallet connected to the origin centralized digital platform and connected to the user's member account on the platform. In this way, the origin centralized digital platform acts as a mediator that arbitrates the timing, manner, and compliance of asset rights on digital platforms that partner with the entity operating the origin centralized digital platform for digital asset uses. For instance, the origin centralized digital platform may confirm the asset complies with both an originator's (first) rule set dictated by the origin platform (e.g., confirm ownership and right to unlock digital asset) and a partner platform's (second) rule set dictated by the partner platform (e.g., confirm asset is compatible and complies with gaming environment restrictions). Upon confirming compliance, the user may be allowed to "unlock" the rights to use the digital asset on the partner platform.

Enabling consumer choice between a Web 2.0 digital asset (VGOOD on a centralized digital platform computing environment) and a Web 3.0 digital asset (NFT stored in a consumer digital wallet on a decentralized computing environment) provides the consumer with access to both decentralized and centralized computing benefits and opportunities. These benefits may include "unlocks" of digital asset use rights within Web 2.0 and Web 3.0 platform partners, as well as Web 3.0 secondary marketplace trading of NFTs. Additionally, with the origin (centralized) computing digital platform acting as a "mediator," a Web 2.0 platform partner is removed from the consumer's choice of digital assets (VGOOD or NFT) allowing for a smooth connection between the brand/IP owner (the origin/creator of digital asset) and the platform partner, while also enabling the consumer/holder of the brand/IP digital asset to access the benefit of "unlocks" of rights within traditional Web 2.0 "walled garden" centralized computing digital platform partners.

Aspects of this disclosure are directed to methods for provisioning, altering, and transferring digital assets between heterogeneous virtual platforms. In an example, a method is presented for controlling the import and export (collectively "transfer") of digital assets. This representative method includes, in any order and in any combination with any of the above and below disclosed features and options: storing, e.g., via a resident or remote memory device of a host (first) digital platform, a VGOOD (first) digital asset associated with a registered (first) personal account of a user; receiving, e.g., via a server computer of the host digital platform, a request from the user to transfer the VGOOD to a destination (second) digital platform, e.g., that is discrete from and operates under different operating parameters than the host platform; converting, e.g., via the server computer—either directly or through a vendor—responsive to receiving the asset transfer request, the VGOOD to a NFT (second) digital asset by generating a cryptographic (crypto) token, assigning the crypto token to the NFT, and recording the crypto token on a transaction block of a blockchain; transferring, e.g., via the server computer—either directly or through a vendor—over a distributed computing network, the NFT from the host digital platform to an intermediate computing node and concomitantly associating the transferred asset with another (second) registered personal user account of the user; and transferring the NFT from the intermediate computing node to the destination platform and concomitantly associating the transferred asset with yet another (third) registered personal account of the user hosted by the destination platform.

Other aspects of this disclosure are directed to decentralized computing systems with attendant control logic for minting, modifying, and exchanging blockchain-secured digital assets and/or the use rights associated with such digital assets. As an example, a decentralized computing system is presented for automating the transfer of digital assets across discrete platforms. The decentralized computing system includes a server database that provisions a host digital platform and optionally stores digital assets, and a communications device that communicatively connects the host platform with a destination digital platform, e.g., via an intermediate computing node, over a distributed computing network. The computing system also includes a server-class (middleware or backend) computer that is interconnected with the server database and the communications device.

Continuing with the foregoing example, the server computer is programmed, e.g., to execute memory-stored firmware and software residing on the server database, to store a VGOOD in a memory device and, at the same time, associate the VGOOD with a registered account of a user on the host platform. The server computer then receives a request from the user to transfer the VGOOD to the destination platform; in response, the VGOOD is converted to an NFT. This conversion process may include generating a crypto token (e.g., selecting type, blockchain, wallet, etc.), assigning the token to the new digital asset (e.g., creating identification codes, metadata, etc.), and recording (tokenizing) the crypto token on a transaction block of a blockchain. The newly minted digital asset is then transferred from the host platform to the intermediate computing node, and the transferred asset is associated with an intermediate platform account of the user. The server computer may then request transfer of the NFT from the intermediate computing node to the destination platform and, at the same time, associate the transferred asset with a user account on the destination platform.

Further aspects of this disclosure are directed to non-transitory computer-readable media (CRM) that store instructions executable by one or more processors of one or more controllers on a computing system network. These instructions, when executed by at least one of the one or more processors, cause at least one of the one or more the controller to perform operations comprising: storing, in a first memory device of a first digital platform, a first digital asset having a first digital construct and thereby associate the first digital asset with a first user account of a first user; receiving, from the first user, a first transfer request to transfer the first digital asset to a second digital platform; converting, responsive to receiving the first transfer request, the first digital asset to a second digital asset having a second digital construct different from the first digital construct, the converting including generating a crypto token, assigning the crypto token to the second digital asset, and recording the crypto token on a transaction block of a blockchain; transferring, over a distributed computing network, the second digital asset from the first digital platform to an intermediate computing node and thereby associate the second digital asset with a second user account of the first user; and requesting transfer of the second digital asset from the intermediate computing node to the second digital platform and thereby associate the second digital asset with a third user account of the first user.

Aspects of this disclosure are also directed to methods for managing digital rights of digital assets. A representative method for managing digital asset rights includes, in any order and in any combination with any of the above and below disclosed features and options: retrieving, from a memory device of a first digital platform, a digital asset having associated therewith an asset content file and a set of digital use rights; receiving, via a server computer of the first digital platform from a computing device of a user, a transfer request to export the asset content file of the digital asset or a derivation of the asset content file to a second digital platform; creating, responsive to receiving the transport request from the user, an NFT token for the digital asset, the creating including recording the crypto token on a transaction block of a blockchain and storing the crypto token in a digital wallet maintained by a digital wallet platform distinct from the first digital platform; and transferring, over a distributed computing network after creating the crypto token, the asset content file or the derivation of the asset content file from the first digital platform to the second digital platform based on one or more use rights in the set of digital use rights.

Another representative method for managing digital rights of digital assets includes, in any order and in any combination with any of the above and below disclosed features and options: receiving, via a server computer of a first digital platform from a computing device of a user, a transfer request to import a digital asset from a second digital platform to the first digital platform, the digital asset having associated therewith a set of digital use rights and an asset content file; retrieving, from a digital wallet maintained by a digital wallet platform distinct from the first digital platform, an NFT associated with the digital asset and recorded on a transaction block of a blockchain; destroying, responsive to receiving the transport request to import the digital asset, the crypto token of the digital asset; and transferring, over a distributed computing network after destroying the crypto token, the digital asset from the second digital platform to the first digital platform based on one or more use rights in the set of digital use rights.

Yet another representative method for managing digital rights of digital assets includes, in any order and in any combination with any of the above and below disclosed features and options: receiving, via a server computer of a first digital platform from a computing device of a user, a transfer request to export a digital asset from a file repository system to a second digital platform, the digital asset having associated therewith a set of digital use rights and an asset content file; retrieving, from a digital wallet maintained by a digital wallet platform distinct from the first digital platform, an NFT associated with the digital asset and recorded on a transaction block of a blockchain; destroying, responsive to receiving the transport request to export the digital asset, the crypto token of the digital asset; and transferring, over a distributed computing network after destroying the crypto token, the asset content file or a derivation of the asset content file of the digital asset to the second digital platform based on one or more use rights in the set of digital use rights.

Another representative method for managing digital asset rights includes, in any order and in any combination with any of the above and below disclosed features and options: importing, to a first digital platform over a distributed computing network, a digital asset having associated therewith a set of digital use rights and an asset content file; destroying, responsive to importing the digital asset, an NFT associated with the digital asset and recorded on a transaction block of a blockchain; associating, via a server computer of the first digital platform, a user account of a user to a digital asset record created on the first digital platform for the digital asset; linking the user account to a video game (VG) partner platform provisioned on a second digital platform; activating, via the server computer, an asset badge containing an unlock code enabling access to one or more use rights in the set of digital use rights of the digital asset; and transmitting, from the first digital platform to the second digital platform over the distributed computing network, the unlock code to thereby enable the user to access a VG asset associated with the digital asset in the VG partner platform.

For any of the disclosed systems, methods, CRM, and digital assets, the server computer may respond to transferring the NFT to the intermediate computing node by automatically closing the user's account on the host digital platform. As another option, the server computer may respond to transferring the NFT to the intermediate computing node by automatically removing the VGOOD from the host platform. In some system architectures, the intermediate computing node is a digital wallet platform and the intermediate node user account is an NFT-enabled digital crypto wallet. In a more specific example, the digital crypto wallet may be in the form of a self-sovereign identity (SSI) digital wallet, which operates through a software application that is connected to an encrypted database and stores a set of user credentials and keys indicative of the user's self-sovereign identity.

For any of the disclosed systems, methods, CRM, and digital assets, the host platform's server computer may receive an import (second) transfer request to transfer the NFT from the destination platform and/or intermediate computing node to the host platform. Responsive to receiving this new transfer request, the server computer may convert—either directly or indirectly through a vendor or the requesting user—the NFT back to a VGOOD. In this instance, converting an NFT to a VGOOD may include burning (e.g., disable from individual access/ownership) the crypto token assigned to the NFT. Upon burning of the NFT, the host system server computer may receive and store in host system memory the newly "deminted" digital asset, e.g., from the destination platform or intermediate node. Burning a crypto token may include sending the crypto token (i.e., the token's private key) to an inaccessible digital wallet or an un-spendable blockchain address.

For any of the disclosed systems, methods, CRM, and digital assets, the intermediate computing node includes a Web 2.5 intermediary platform operable to arbitrate transfer of a digital asset between host and destination digital platforms. In this instance, a server-class computer of the Web 2.5 intermediary platform may determine whether or not an asset transfer request complies with a predefined host rule set established by the host platform. Likewise, the server-class computer of the Web 2.5 intermediary platform may determine whether or not an asset transfer request complies with a predefined destination rule set established by the destination platform. In either of the foregoing instances, transferring a digital asset to/from host and destination platforms, e.g., via an intermediate node, may be responsive to confirming the transfer request complies with the host platform's rule set and/or the destination platform's rule set.

For any of the disclosed systems, methods, CRM, and digital assets, the host digital platform may be a hybrid centralized/decentralized Web 2.5 virtual goods platform and the VGOOD may be an intangible virtual good. In this instance, the destination digital platform may be a Web 2.0 or a Web 3.0 online gaming platform. As a further option, the destination platform may include one or more video game environments, one or more virtual reality environments, and/or one or more augmented reality AR environments. It may be desirable that the host platform be owned and operated by a host (first) entity, the intermediate node be owned and operated by a middleware (second) entity distinct from the host entity, and the destination platform be owned and operated by a destination (third) entity, distinct from the other two entities.

The above Summary does not represent every embodiment and every aspect of this disclosure. Rather, the foregoing summary merely provides a synopsis of some of the novel concepts and features set forth herein. The above features and advantages, and other features and attendant advantages of the disclosure, will be readily apparent from the following Detailed Description of illustrated examples and representative modes for carrying out the present disclosure when taken in connection with the accompanying drawings and the appended claims. Moreover, this disclosure expressly includes any and all combinations and subcombinations of the features presented above and below.

12 transferring digital assets across heterogeneous digital platforms in accordance with aspects of the present disclosure.

Figure 3:
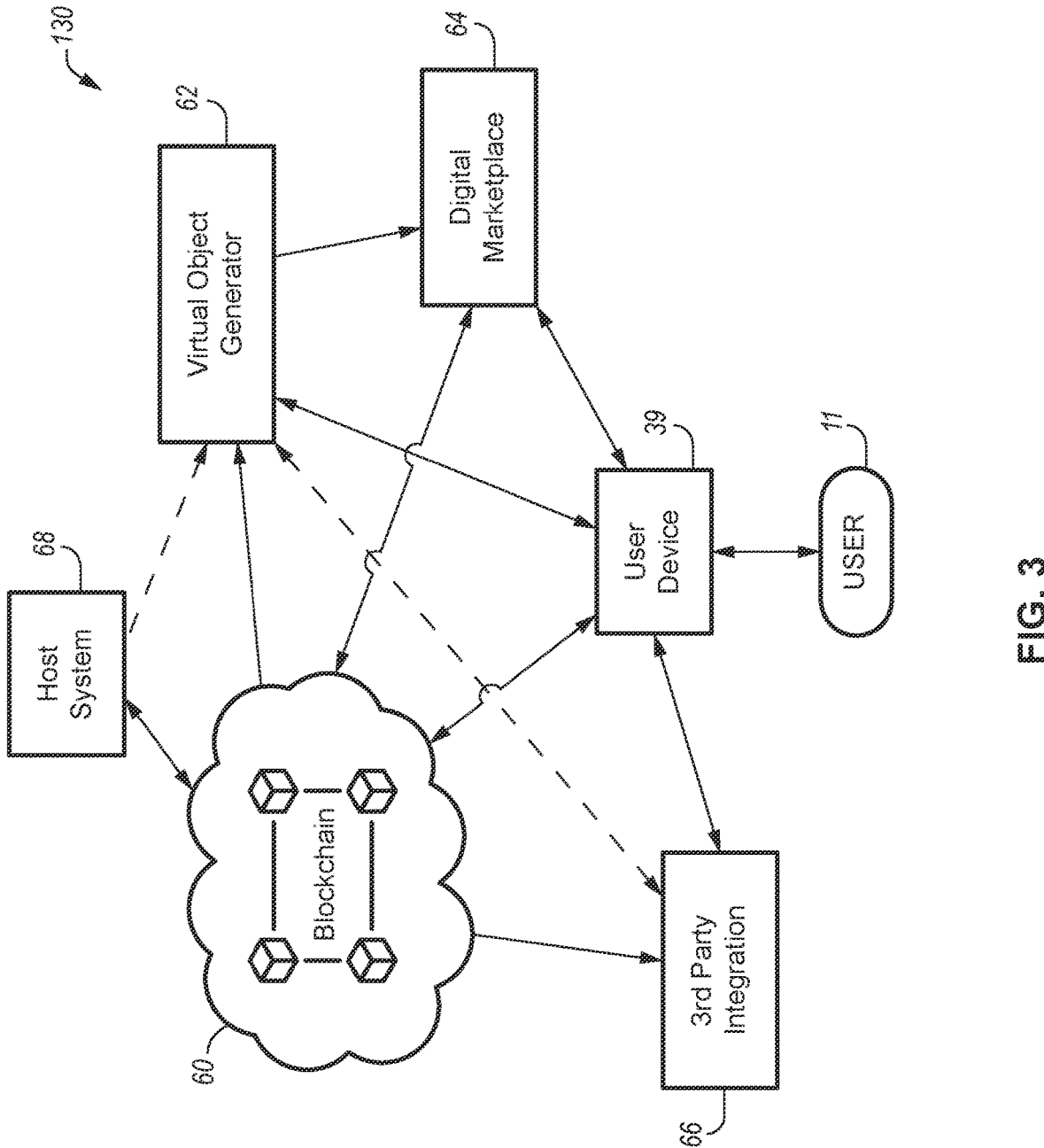

FIG. 3 is a diagrammatic illustration of a representative decentralized computing system architecture for generating, augmenting, and importing/exporting cryptographic digital assets in accordance with aspects of the present disclosure.

Figure 4:
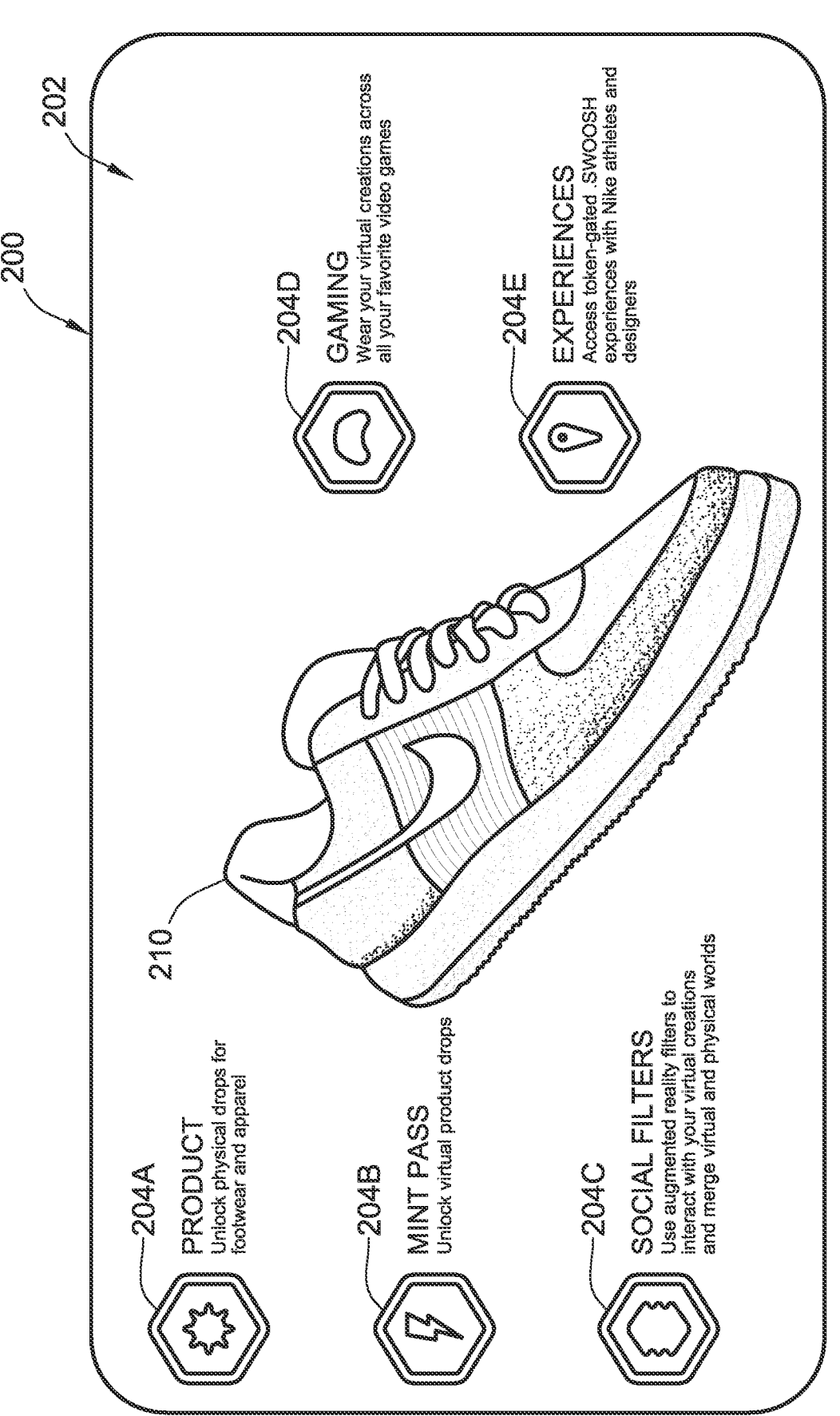

FIG. 4 is an illustration of a representative graphical user interface (GUI) of a personal computing device illustrating a library of user-selectable digital badges including a badge for unlocking a digital asset available on and/or for transfer to a third-party platform in accordance with aspects of the present disclosure.

Figure 5:
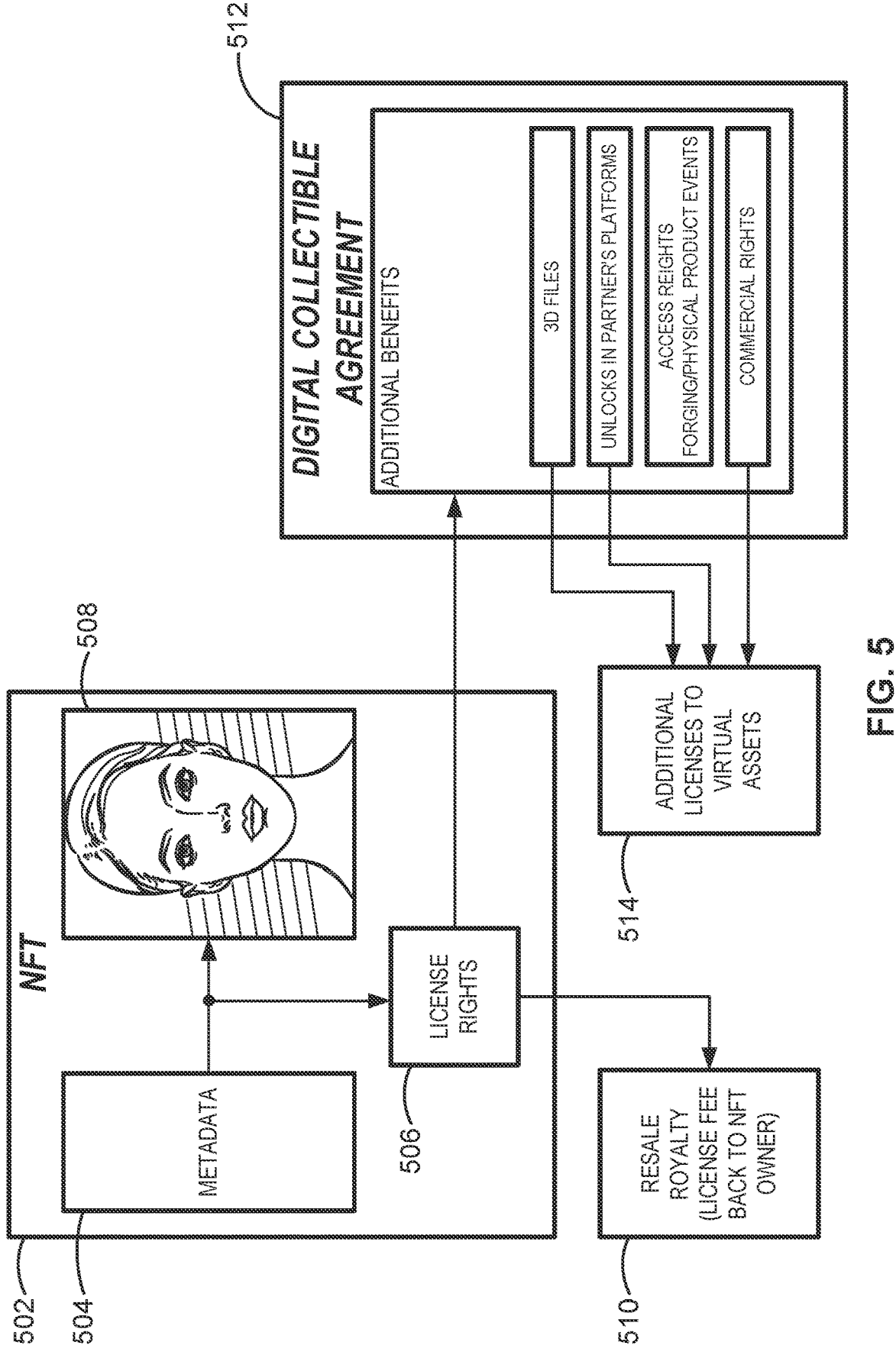

FIG. 5 is a schematic diagram illustrating a representative blockchain-secured digital asset including a base digital asset, a set of asset use rights, and at least one unlock feature in accordance with aspects of the present disclosure.

Figure 6:
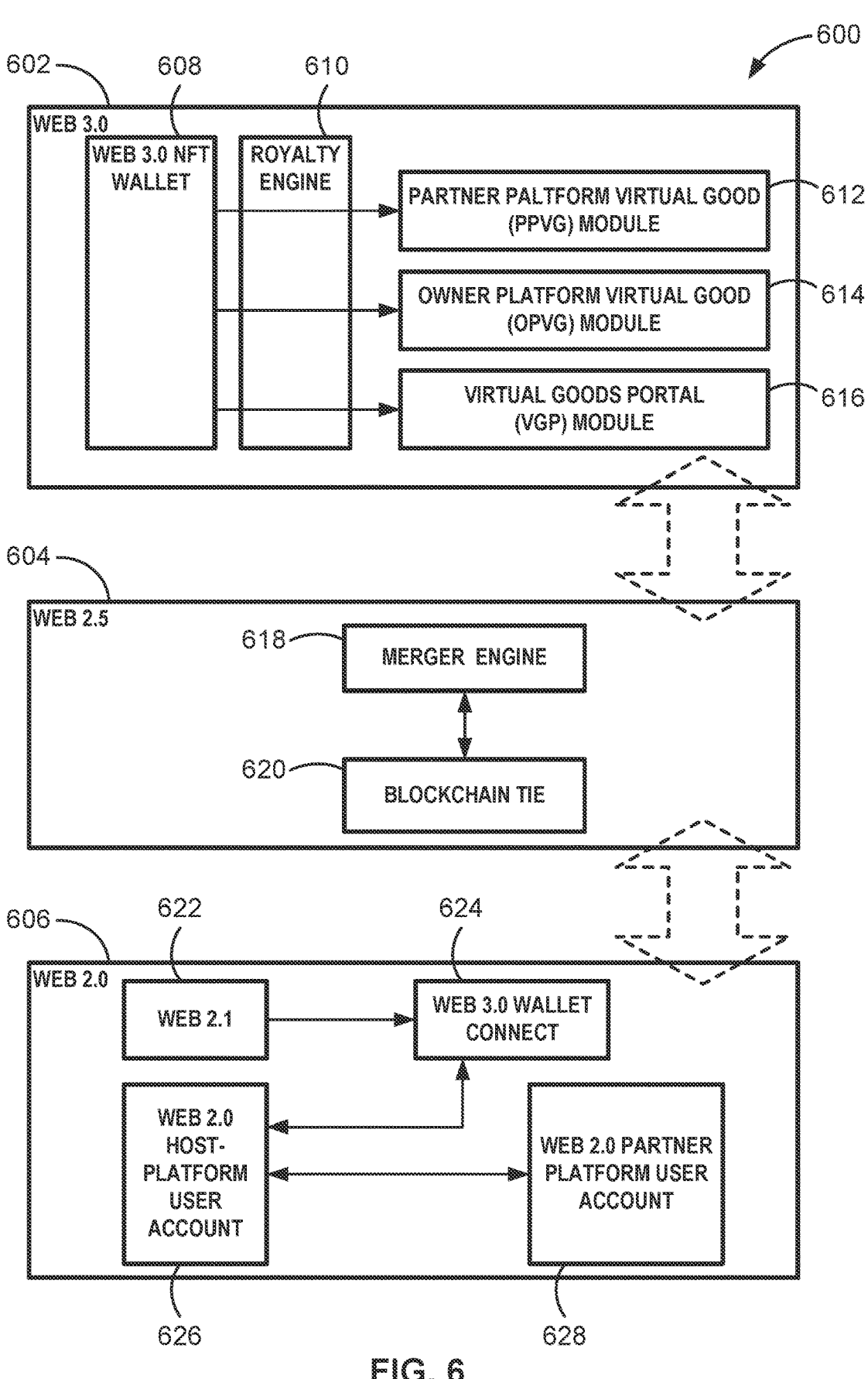

FIG. 6 is a schematic diagram illustrating a representative distributed computing network for unlocking use rights for base digital assets of blockchain-secured digital assets across heterogeneous digital platforms in accordance with aspects of the present disclosure.

Figure 7:
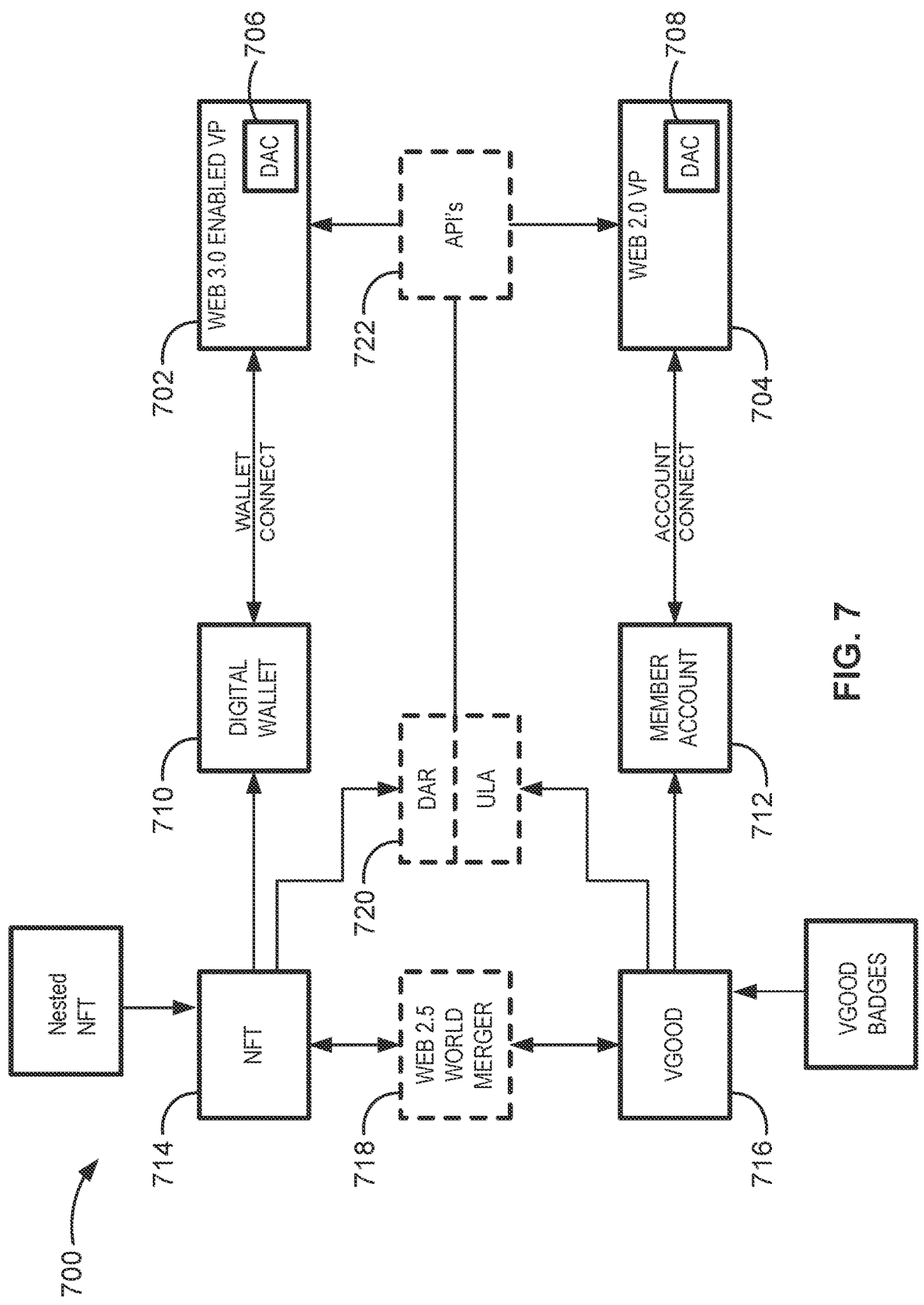

FIG. 7 is a schematic diagram illustrating a representative system framework enabling a user to choose, move between, and/or interact with both a Web2.0 and a Web3.0 ecosystem in accordance with aspects of the present disclosure.

Figure 8:
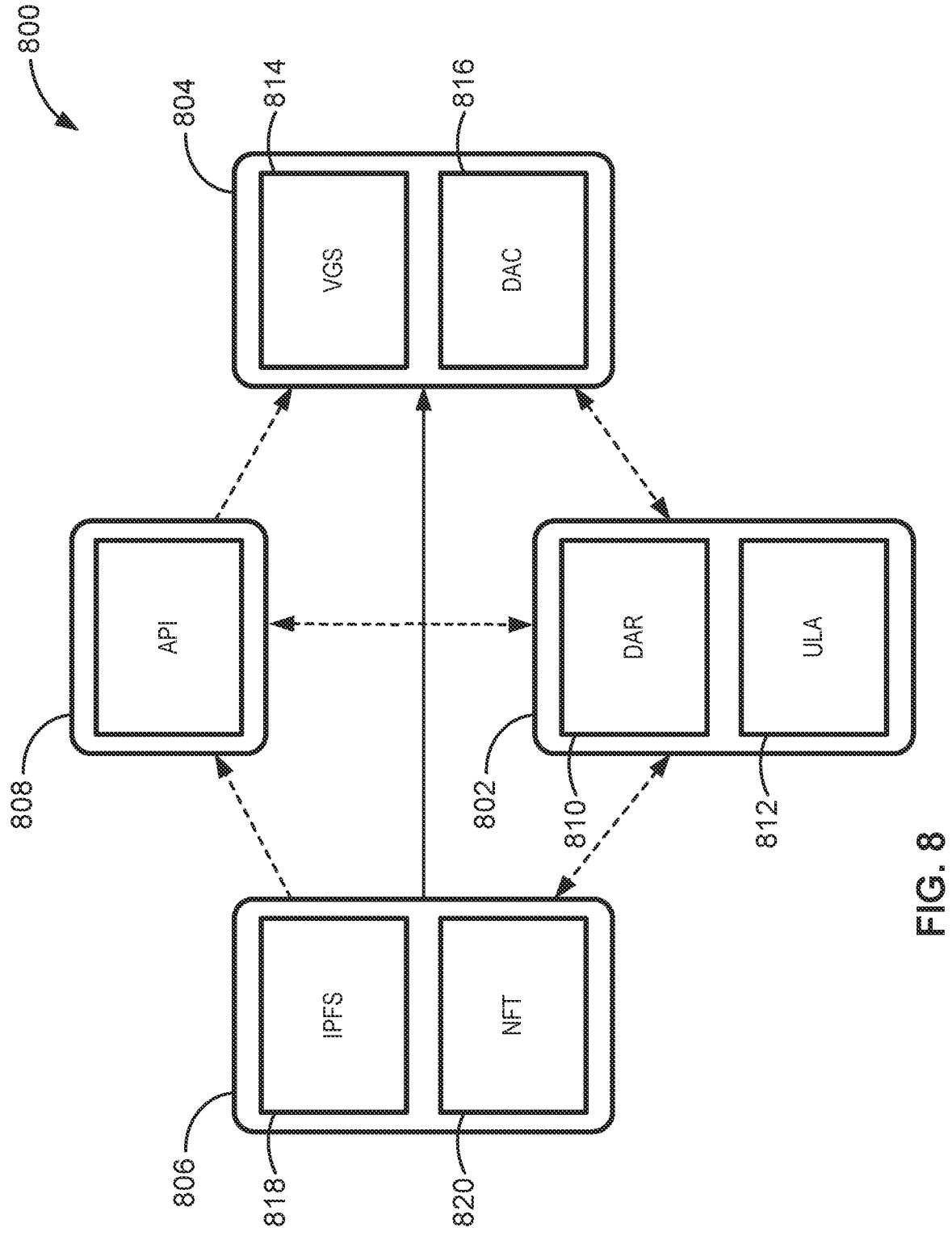

FIG. 8 is a schematic diagram illustrating a representative decentralized and distributed computing network for unlocking digital assets and/or user rights of digital assets across heterogeneous digital platforms in accordance with aspects of the present disclosure.

Figure 9:
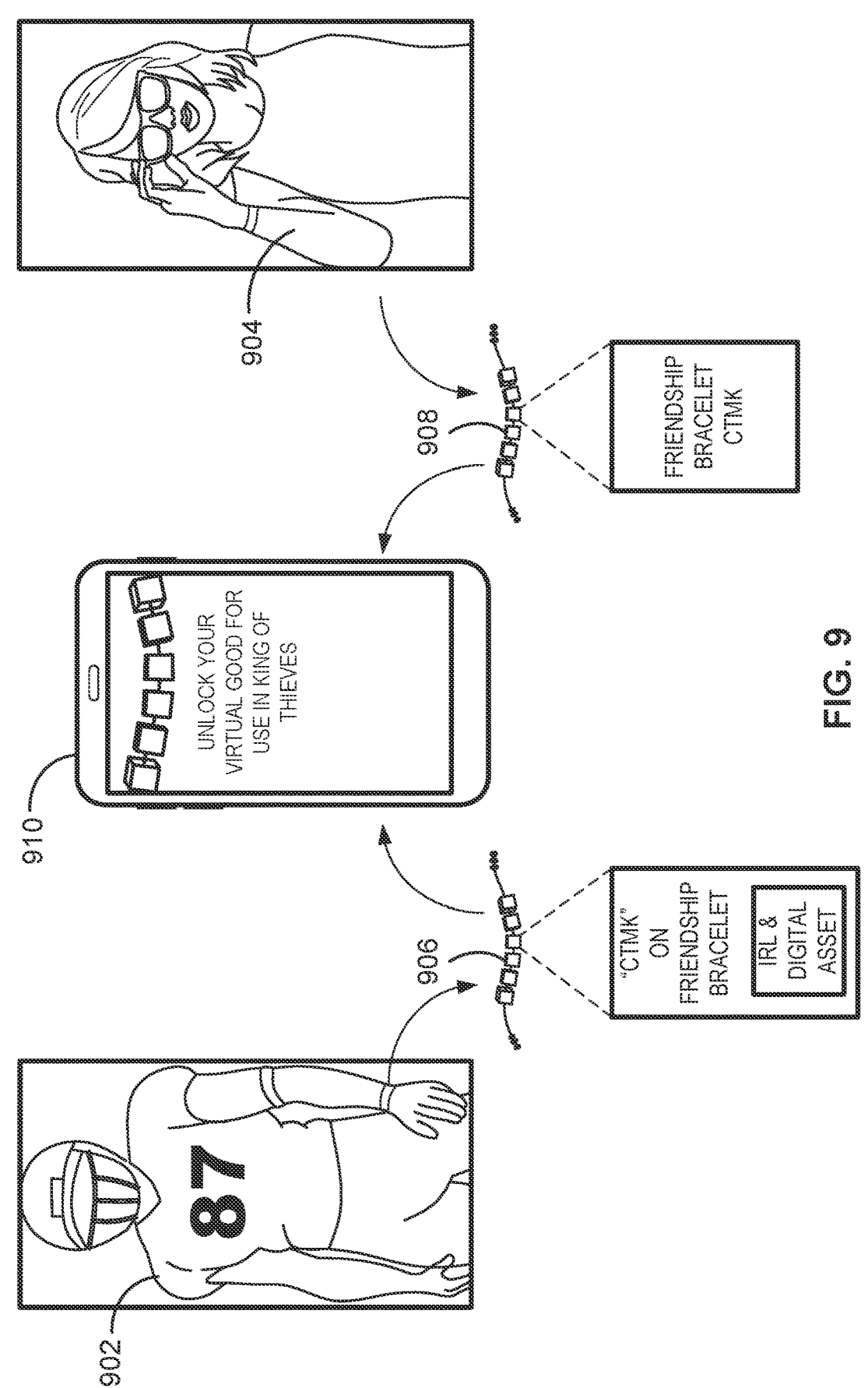

FIG. 9 is an illustration of users unlocking virtual goods and or use rights of virtual goods for use on digital partner platforms in accordance with aspects of the present disclosure.

This disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and will be described in detail herein with the understanding that these representative examples are provided as an exemplification of the disclosed principles, not limitations of the broad aspects of the disclosure. To that extent, elements and limitations that are described in the Abstract, Technical Field, Background, Summary, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for case of reference to similar features in the specification and drawings and to demarcate between similar elements in the claims.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "comprising," "having," "containing," and the like shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, medial, lateral, proximal, distal, vertical, horizontal, top, bottom, front, back, left, right, etc., may be with respect to an article of footwear when worn on a user's foot and operatively oriented with a ground-engaging portion of the sole structure seated on a flat surface, for example.

Aspects of this disclosure are directed to computer-generated digital/virtual assets, such collectible digital shoes (e.g., "CryptoKicks" or "CK"), that, in some instances, may be secured and/or uniquely identified by a cryptographic token and may be linked and/or distributed with real-world, physical products, such as tangible shoes. In some applications, instead of being linked to or distributed with real-world, physical products, the digital asset may be linked to or distributed with a 2D or 3D design file, such as a CAD model, graphical rendering, image, video, or drawing package from which a physical product may be constructed or otherwise represented.

Various digital assets may be used by a company, for example, to stay apprised of consumer trends and preferences. For instance, a company may create a number of product-ready designs with different traits, silhouettes, colors, and the like, and may distribute them across one or more digital platforms as digital assets, and may then monitor the popularity, value, demand, and/or virtual use of different product designs and traits. In doing so, the company may gain a valuable understanding of the real-time demand for a product, which may be helpful when prioritizing designs for future manufacturing.

A digital asset may be created and disseminated, for example, for brand promotion purposes. A digital shoe may be created, for example, in a preset and/or controlled limited quantity and distributed as part of a promotion, an event, a game, or a contest. For instance, spectators at a professional sporting event (e.g., a home opener) may be given the right to acquire one of a limited quantity of unique digital assets, each being separately secured via its own cryptographic token.

As used herein, a "digital asset" may refer to any computer-generated virtual object, including digital footwear, apparel, headgear, eyewear, avatars, pets, images, sounds, videos, etc. Comparatively, use of the term "cryptographic digital asset" of "NFT" may be in reference to a digital asset protected by a unique, non-fungible tokenized code ("token") registered on and validated by a blockchain platform or otherwise registered in an immutable database. Furthermore, all references to "CryptoKicks" and variations thereof within this disclosure should be understood to be merely exemplary of a digital asset and should not be per se limited to footwear. All such references should be read to equally apply to apparel (e.g., "CryptoThreads"), headgear (e.g., "CryptoLids"), and sporting equipment (e.g., "CryptoGear"), or other such digital assets.

In general, a digital asset (including both NFTs and VGOODS) may include a virtual object having attribute information that defines visual, audible, and/or other characterizing traits for that asset as well as certain attendant use rights or conditions. In some instances, these attributes may be represented or derived, at least in part, from an encrypted alphanumeric string that may be associated with the digital asset. In a footwear context, for example, each digital asset may include a virtual object resembling a digital-art version of a sneaker. The provided digital shoe attributes may then comprise attributes describing the digital shoe such as Style, Materials, Family, Heat, Colorway, Future Attributes, Make, Model, Pattern Scheme, Image Background, etc. In some embodiments, an originally created digital asset, and in particular an NFT, may include metadata within its recordation that is representative of attributes from a companion physical shoe.

In some implementations, a user's digital asset may be capable of being exported from a host platform or NFT-enabled crypto wallet and imported into one or more third-party digital platforms. For instance, a CryptoKick, CryptoThread, or CryptoLid may be converted into a downloadable graphic "skin" that may be imported into an online VG platform and "worn" by a video game character that may be developed and/or controlled by the user. If a user is active in a certain basketball video game, for example, a CryptoKick may be imported into that game and worn by the user's player or team. When a CryptoKick is imported into a video game, different attributes of the CryptoKick may impart changes in the ability/level of a user's character outfitted with the asset. In one example, the attributes of the user's character may be positively (or negatively) influenced by the rarity (or abundance), the exclusivity (or commonness), a brand name (or generic) make/model, and/or the distinct attributes of an imported digital asset. For example, a rare CryptoKick may impart better jumping ability or lateral quickness, a rare CryptoThread may impart better strength or speed, and a rare CryptoLid may impart better vision.

In other embodiments, instead of specifically exporting the Cryptokick to the VG platform, the host system may instead communicate access rights associated with the Cryptokick to the VG platform, where receipt of those access rights may then unlock a corresponding digital asset within the video game or VG platform. Such a strategy may reduce the need to transfer larger data files between platforms, which can lead to speed and performance degradation that could negatively impact the user experience.

Figure 1:
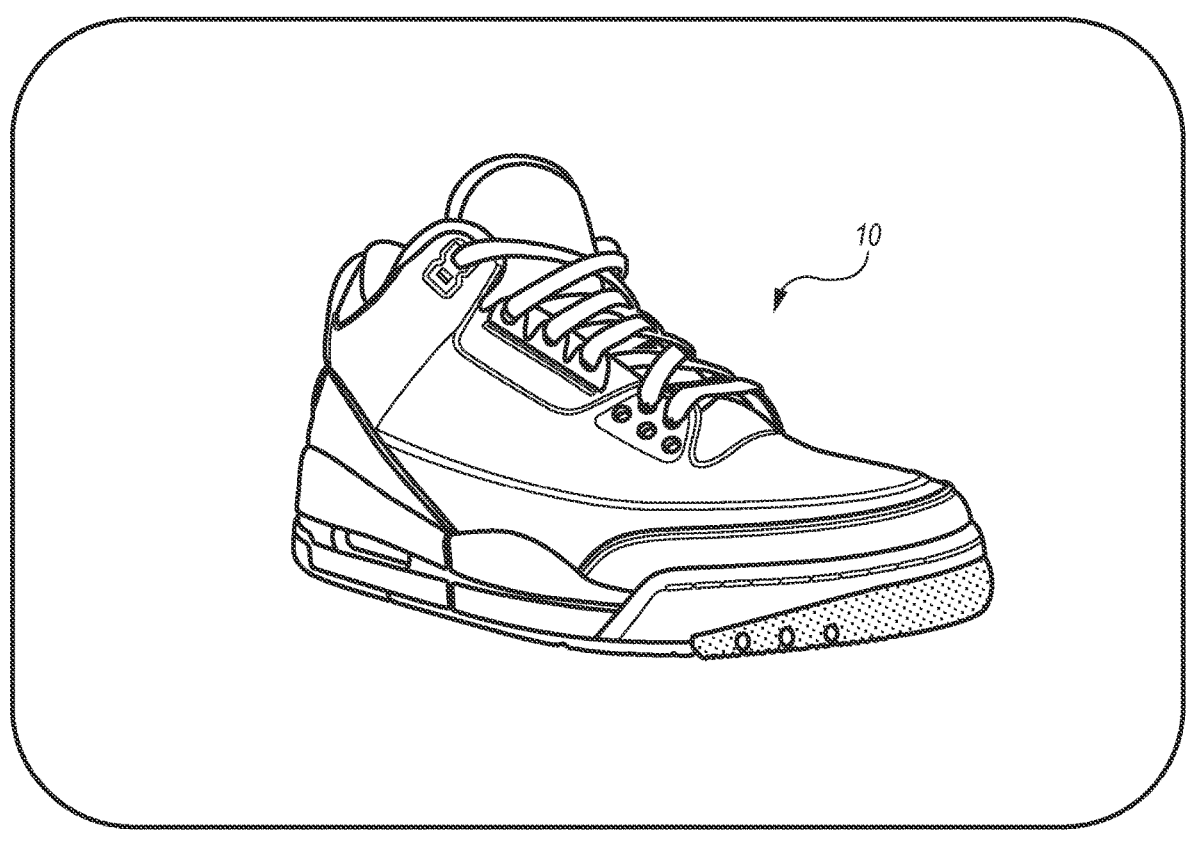
FIG. 1 is a perspective-view illustration of a representative article of footwear that is associated with a digital asset protected by a cryptographic token that is secured by a blockchain ledger in accordance with aspects of the present disclosure.

Referring now to the drawings, wherein like reference numbers refer to like features throughout the several views, there is shown in FIG. 1 a representative article of footwear, which is designated generally at 10 and portrayed herein for purposes of discussion as an athletic shoe or "sneaker." The illustrated article of footwear 10—also referred to herein as "footwear" or "shoe" for brevity—is merely an exemplary application with which novel aspects and features of this disclosure may be practiced. In an example, the illustrated article of footwear 10 may be linked to or resemble a digital image created for a CryptoKick. In the same vein, implementation of the present concepts for a digital shoe and a cryptographic token for footwear should also be appreciated as representative implementations of the disclosed concepts. It will therefore be understood that aspects of this disclosure may be utilized for any logically relevant consumer product or tangible good, may be backed by an assortment of decentralized blockchain ledgers, and may be implemented by various distributed computing networks. As used herein, the terms "shoe" and "footwear," including permutations thereof, may be used interchangeably and synonymously to reference any suitable type of garment worn on a human foot. Lastly, features presented in the drawings are not necessarily to scale and are provided purely for instructional purposes. Thus, the specific and relative dimensions shown in the drawings are not to be construed as limiting.

As a general matter, each element, panel, section, material, and physical attribute of the article of footwear 10 shown in FIG. 1 may be separately rendered or defined in a digital CryptoKick. For instance, a high-resolution digital image (e.g., 300+DPI), an artistic digital rendering, or a three-dimensional (3D) image file may be derived from the footwear 10 and memory-stored in a suitable image file format (e.g., JPEG XL, Vector, etc.). These visual creations may be referenced to in metadata via a pointer to a file location. Furthermore, these attributes may similarly be reflected within the metadata of a corresponding NFT that has been minted and assigned to the digital asset corresponding to the footwear 10 of FIG. 1.

Figure 2:
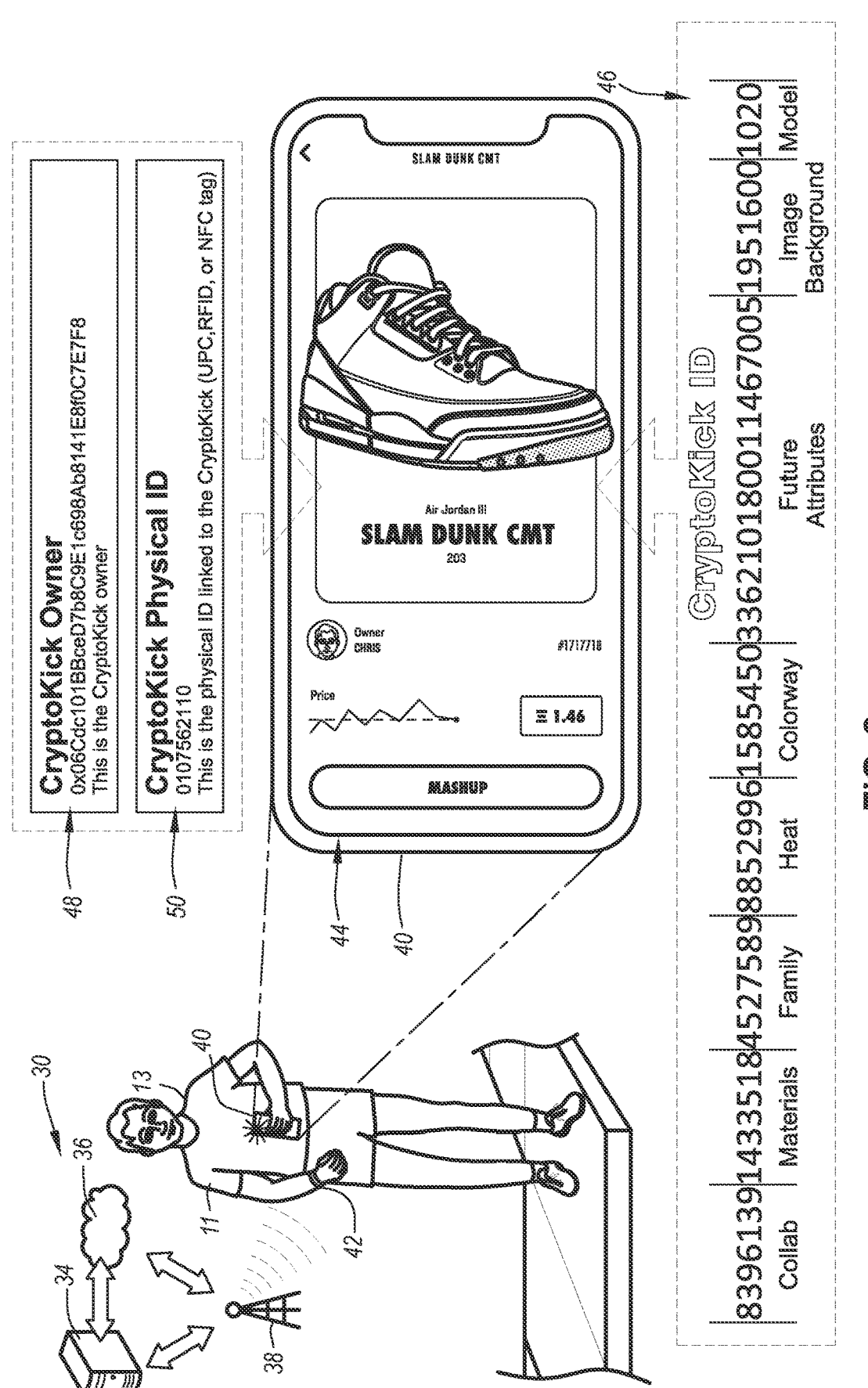
FIG. 2 is a diagrammatic illustration of a representative distributed computing system for accessing, modifying.

FIG. 2 is a diagrammatic illustration of an exemplary distributed computing network, designated generally as 30, with attendant control logic for accessing, modifying, and transferring blockchain-enabled digital assets. User 11 is shown communicatively connecting to a remote host system 34 (e.g., NIKE®.SWOOSH® platform) and/or a cloud computing system 36 (e.g., NFT-enabled digital wallet platform or Web 2.5 asset-exchange arbitration platform) via a wireless communications network 38. While illustrating a single user 11 communicating over the distributed computing network 30 with a single host system 34 and a single cloud computing system 36, it is envisioned that any number of users may communicate with any number of remote computing nodes that are suitably equipped for exchanging information and data across a distributed network. Wireless data exchanges between the user 11 and remote computing nodes on the distributed computing network 30 may be conducted directly, e.g., through direct communications between the host system 34/cloud computing system 36 and a user device 39 (e.g., the user's smartphone 40, smartwatch 42, or other suitable personal computing device), or indirectly, e.g., with all communications between the user 11 and other computing nodes being routed through the host system 34. As discussed herein, the terms Web 2.0, Web 2.5, and Web 3.0 may be used interchangeably with the terms Web2.0, Web2.5, and Web3.0, respectively, without departing from the intended scope and sprit of this disclosure.

Only select components of the distributed computing network 30 of FIG. 2 and the decentralized computing system 130 of FIG. 3 are shown and will herein be described in further detail. Nevertheless, the networks, systems, and devices discussed herein can include numerous additional and alternative features, and other available hardware and peripheral components, for example, for carrying out the various methods and functions disclosed herein. While the described system relies on a blockchain ledger and process for recording ownership of the digital asset, for example, it should be understood that the present technology may operate on or in communication with a public chain or a private chain, and may utilize one or more forms of cryptography, encoding, proof of work challenges, or other concepts and technologies involved in available blockchain standards or suitable alternative immutable databases/ledgers.

With continuing reference to FIG. 2, the host system 34 may be implemented as a high-speed server-class computer or a mainframe computing device capable of handling bulk data processing, resource planning, and transaction processing. For instance, the host system 34 may operate as middleware in a client-server interface for conducting any necessary data exchanges and communications with one or more "third party" servers to complete a particular transaction. The cloud computing system 36, on the other hand, may operate as middleware for IoT (Internet of Things), WoT (Web of Things), Internet of Adaptive Apparel and Footwear (IoAAF), and/or M2M (machine-to-machine) services, connecting an assortment of heterogeneous electronic devices with a service-oriented architecture (SOA) via a data network. As an example, cloud computing system 36 may be implemented as a middleware node to provide different functions for dynamically onboarding heterogeneous devices, multiplexing data from each of these devices, and routing the data through reconfigurable processing logic for processing and transmission to one or more destination applications. Network 38 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). Most if not all data transaction functions carried out by the user 11 may be conducted, for example, over a wireless network, such as a wireless local area network (WLAN) or cellular data network.

As a decentralized blockchain platform, computing system 130 operates as an open, yet encrypted peer-to-peer network in which asset transaction records—known as "blocks"—are linked via cryptographic hash functions in a distributed, immutable ledger of interconnected blocks, i.e., a "blockchain." Each block in the chain includes one or more digital asset transactions accompanied by corroboration information representing a validity of each transaction as assessed by peer-validation devices. Encrypted, decentralized computing architectures allow for identity verification and authentication of transacted assets while preventing duplication of a cryptography-protected ("cryptographic") digital asset registered to the platform. Decentralized asset management may work by encrypting a proprietary asset file, breaking the encrypted code into tiny "nonsense" shards, and sending these code shards to numerous different computing nodes on the decentralized computing network. A validated owner is provided with a private key that indicates where in the network the asset is located and how to reassemble or "decrypt" the file. For use as a distributed ledger, an individual blockchain is typically managed by a host administrator and distributed to multiple peers collectively adhering to a protocol for inter-node communication and block validation.

One should appreciate that disclosed systems and techniques provide many advantageous technical effects including construction and storage of a digital asset blockchain representing user-to-user transactions of virtual collectibles and other digital assets. Further, blockchain technology enables the creation of unique, yet fully transferrable digital assets that maintain value by way of the general inability to make lossless copies (unlike traditional, unsecured digital files). Additional advantageous technical effects may include secure network architectures and control logic for importing and exporting digital assets across heterogeneous digital platforms in which platform-to-platform security, accessibility, and interoperability may be asynchronous and incompatible. As a further example, disclosed systems and methods allow a host digital platform to provision digital assets and selectively tokenize those assets without ever taking custodial possession of the resultant non-fungible assets.

FIG. 3 provides an example of a functional structure of a decentralized computing system 130, which may be accessed by a user 11 via a distributed computing network 30 as shown in FIG. 2. As generally illustrated, a user 11 may operatively interface with a user device 39 (human-machine interface (HMI)) that may include one or more of a wireless-enabled smartphone 40, a tablet computer, a smart watch 42, a laptop computer, a desktop computer, a stand-alone video game console, smart footwear/apparel, or other internet-enabled computing device. The user device 39 is shown wirelessly communicating with multiple remote computing nodes, including an immutable public database, which is represented in FIG. 3 by a blockchain service 60 (e.g., Ethereum, Solana, Polygon, Tezos, etc.), as well as a virtual object generator 62, an online digital marketplace 64, a third-party integration engine 66 and/or middleware and backend service providers.

Blockchain service 60 of FIG. 3 maintains a crypto-graphic distributed ledger with an ever-growing list of record blocks, at least some of which have registered thereon one or more non-fungible tokens that each contains description and identification information representative of a digital asset. The user 11 may employ the user device 39 to setup and access a digital blockchain locker or an NFT-enabled crypto wallet that securely stores a private cryptographic key that permits the user device to retrieve, read, and manipulate the encrypted data associated with the token. This private key, for example, may enable the user 11 to freely transfer ownership of the non-fungible token and any digital asset associated therewith. It should be understood that not all digital wallets support blockchain-backed objects, and not all crypto wallets support NFTs. In the same vein, not all distributed ledgers support blockchain-backed objects, and not all blockchains and blockchain service providers support NFTs.

With continuing reference to FIG. 3, a virtual object generator 62 may be accessed to create a digital asset (referred to interchangeably as "digital object") on the basis of the information provided by a host system 68, a user 11, a collaborator, an artist or designer, etc. The virtual object generator 62 may be responsible for expressing underlying object code (e.g., genomic information) into observable characteristics (e.g., phenotypic traits). The virtual object generator 62 may employ sets of stylistic and artistic rules such that the resultant digital objects are unique yet recog-nizable according to predefined silhouettes, styles, articles, characters, etc. A virtual object generator 62 may optionally generate digital assets on the basis of other factors, such as the age of the asset, user activity (e.g., tracked via the user device 39), or use of the asset via third-party individuals and/or platforms. In such an instance, these inputs may alter the visual, audible, and/or contextual expression of the digital asset, may unlock new abilities associated with the asset, may enable additional import/export/trading rights for the asset, activate physical production rights, etc. By way of non-limiting example, a color or color scheme of a Cryp-toKick may depend on a "genetically assigned" color, together with the age of the asset and/or use of the asset in a virtual world or via a linked pair of physical shoes in the real world. The initial color together with the age/experi-ence-based alteration may result in a new color that has its own relative rarity score/value.

In accord with the illustrated example, the blockchain service 60 and the virtual object generator 62 can be in communication with a hosted platform, digital market, ven-dor, forum, social platform, or the like (collectively desig-nated as "digital marketplace 64"). The digital marketplace

64 may represent a variety of different digital assets in such a manner that permits the organized trade, transfer, or sale/purchase of these assets between parties. Upon the closing of a sale, for example, the digital marketplace 64 may update the blockchain 60 with the new ownership information and facilitate the transfer of new or existing keys to the new asset holder. A marketplace 64 may further enable various social engagement functions, such as voting or commenting on the represented virtual objects. Likewise, in some instances the marketplace 64 may assess and score the rarity of a particular virtual object based on the sum total of the object's expressed traits. Such a rarity score may then enable the marketplace and/or users who participate within the marketplace to better assess the value of the object.

Decentralized computing system 130 of FIG. 3 may include a third-party integration engine 66 that may enable the use of a digital asset in different contexts or different manners or different platforms. This third-party integration engine 66 may operate as an Application Programming Interface (API) on a dedicated mobile app provided on the user's device 39 or as a dedicated cloud-based middleware service. The third-party integration engine 66 may option-ally make a digital asset (for example, as expressed by the virtual object generator 62) and/or the underlying asset code available for external use (e.g., for import to and use within an augmented reality (AR), virtual reality (VR), or video game (VG) platform). Examples of such a use may include a digital gaming "skin" worn by a third-party video game character, a digital game asset capable of being used by a third-party video game character, digital footwear/apparel superposed or superimposed within an AR or VR environ-ment, digital artwork displays, physical print generation, manufacturing production, and the like.

As further shown in FIG. 3, a corporate host system 68 may be in communication with the user device 39, block-chain service 60, virtual object generator 62, and digital marketplace 64 for creating new digital assets, offering preexisting digital assets, and/or directly or indirectly pro-visioning blockchain-secured digital assets. Additionally, the host system 68 may provide one or more rules to the virtual object generator 62 to constrain the manner and style in which underlying asset code and attendant information from the blockchain 60 is expressed in a visual/artistic form. Host system 68 may facilitate the export of digital assets to third-party platforms, either directly or through the third-party integration engine 66, through an NFT-enabled crypto wallet service, and/or through an intermediary arbitrator platform.

As will be explained in further detail below, a user may create, retrieve, access, or receive (collectively "obtain") a Web2.0 VGOOD, e.g., through a registered personal account on the host system 68. If the user then wishes to export the VGOOD to a third-party virtual platform or to leave the host platform from which the VGOOD is obtained, the host platform may automatically mint an NFT for the VGOOD and, if desired, the user may be prompted to approve the minting. The newly minted NFT may be placed into a self-sovereign wallet for subsequent transfer to any of a myriad of third-party platforms. If the user wishes to return to the host platform and/or import the VGOOD back to the host platform, the user may be required to burn the NFT or turn over the NFT to the host platform for disposal. With this arrangement, the host platform does not have to offer custodial services or crypto wallet services for storing minted NFTs.

In accord with the non-limiting examples of FIGS. 2 and 3, the host system 68 may be configured as a non-blockchain Web 2.5 Virtual Goods Platform with an active database that allows registered members to trade VGOODs and other non-NFT digital assets. This Web 2.5 Platform may act as a membership platform that also connects to one or more AR, VR, VG gaming platforms, e.g., through the coordination and compliance features provided by integration engine 66. If the user 11 wishes to export a digital asset to a Web 3.0 platform, the host system 68 may automate the minting of an NFT for the corresponding VGOOD; for at least some applications, the NFT may be transferred to a self-sovereign identity (SSI) digital wallet and the VGOOD may be removed from the host system 68. Unlike conventional digital wallets, an SSI digital wallet gives individual users control over the type(s) of information used to certify proof of identify to websites, services, and applications across the Web. An SSI digital wallet may operate as a software application associated with an encrypted database that stores credentials, keys, and other unique information, such as one or more Decentralized Identifiers (DIDs), to generate a self-sovereign identity for a user. After minting the NFT and effectively transferring the VGOOD off of the host system 68, the user 11 is enabled to sell, trade, modify, transfer, and/or implement the NFT and associated asset on a Web 3.0 or other virtual platform. It may be desirable that the host system 68 not take custody or possession of the NFT; a user 11, therefore, is not required to mint a digital asset to make use of existing services on the host system 68 platform.

A user 11 that obtains an NFT from an individual or vendor outside of the host system (e.g., via the online digital marketplace 64) may wish to import the digital asset associated with that NFT to the host system 68. In such an instance, the host system 68 may import the NFT's digital asset or generate a corresponding VGOOD that is compatible with that platform's operating system following the request to import. The user 11 may then be required to purchase the resultant asset, burn the NFT, and/or relinquish ownership of the NFT to the host system 68 or trusted third party. In some implementations, the host system 68 may hold the NFT until the user 11 wishes to export the digital asset and or leave the host system 68 platform (e.g., deactivate their personal account); the NFT may be returned to the user 11. Otherwise, the host system 68 may burn any relinquished NFT and mint new ones each time users request to export or leave.

As another option for facilitating the transfer of digital assets between heterogeneous virtual platforms, the host system 68 may provision NFT minting services by sourcing or operating as a Web 2.5 intermediary platform to act as a mediator that arbitrates the timing, manner, and compliance of asset transfers between origin and destination platforms. This Web 2.5 intermediary platform may connect a registered member account on the host system 68 with a corresponding Web 2.0 gaming account or Web 3.0 AR/VR account for the selective importation and exportation of digital assets. Alternatively, the host system 68 may function as a Web 2.5 ecosystem, connect to a user's NFT-enabled digital crypto wallet, and arbitrate the transfer of an NFT-secured digital asset from the wallet to a third-party virtual platform. For instance, host system 68 may evaluate an NFT held in an SSI digital wallet of the user 11 to confirm that the NFT is 'unlockable' for use in another partner platform and/or is compliant/compatible for transfer to the partner platform. A Web 2.5 entity may be typified as a convergence service that exists as a junction between traditional "centralized" Web 2.0 nodes and emerging "decentralized" Web 3.0 entities. The Web 2.5 may be considered a participatory "social web" with sites that emphasize user-generated content, case of use, participatory culture, and interoperability with other products, systems, and devices. By comparison, Web 2.0 networked devices use HTTP in the form of unique web addresses to locate information that is typically stored at a fixed location, e.g., on a single server, whereas Web 3.0 networked devices locate information based predominantly on content and, thus, is typically stored in multiple locations simultaneously.

Turning next to FIG. 4, there is shown an example of a graphical user interface (GUI) 200 that operates on a personal computing device (e.g., user device 39) and displays a badge library 202 that contains user-selectable digital badges 204A-204E for obtaining and transacting digital assets, physical goods, virtual experiences, and user rights for using digital assets. In accord with the illustrated example, a user 11 may select a PRODUCT DROP (first) badge 204A to retrieve information about and request access to ("unlock") a limited-release event ("drop") of physical footwear, apparel, or other good or experience. The user 11 may also select a MINT PASS (second) badge 204B to retrieve information about and request access to a limited-release event for a virtual product, a VGOOD or NFT, or access to rights to use a digital asset.

A SOCIAL FILTER (third) badge 204C may be selected by the user 11 to access filters and, if desired, assorted user-selectable alteration options for modifying a user's virtual creation or other digital asset. A user may select badge 204C to access an augmented reality filter to interact with a virtual creation of the user and/or merge virtual and physical worlds (e.g., convert a virtual creation to a physical good or vice versa). The SOCIAL FILTER badge 204C may also enable the user 11 to export their modified creation/asset to an augmented-reality environment and interact with the creation/asset within that third-party platform. The user 11 may also select a GAMING SKIN (fourth) badge 204D to export a digital asset, such as high-resolution 3D digital shoe image 210, to a destination digital platform, such as an online video game. As another option, badge 204D may be unlocked to access authorization, licenses, rights, etc., to use a digital asset within a gaming environment. The badge library 202 of FIG. 4 also contains a TOKENIZED EXPERIENCE (fifth) badge 204E that provides the user 11 with access to token-gated experiences and prizes (e.g., NFT associated with meeting a professional athlete, meeting a famous shoe designer, etc.). It should be appreciated that the GUI badge library 202 may contain greater or fewer badges that provision additional or alternative functionality to those described above. Moreover, the provider of such badges may require any one or more of the illustrated badges be purchased, earned, or activated before providing a given user access to a badge.

As indicated above, badge library 202 includes one or more badges for unlocking digital assets and/or the right to use, modify, or transfer digital assets to third-party platforms. A traditional third-party gaming platform may limit the amount of NFT use on their platform (e.g., single-use limitation where each shoe NFT or apparel NFT may be unlocked only once) or strictly enforce user restrictions of NFT use on their platform (e.g., only athletic shoes of a particular type with a particular set of attributes may be unlocked and imported into a basketball video game). To address these types of third-party limitations and restrictions, an NFT badge may be integrated into a multilayer "nested" NFT, examples of which are provided in U.S. Pat. No. 11,475,449 which is incorporated by reference in its entirety and for all that it discloses. In a non-limiting example, GAMING SKIN badge 204D may provide the user 11 with a one-time unlock NFT badge that is embedded within an AIRFORCE ONE® (AF1) shoe NFT. In a specific example, a blockchain-secured multilayer digital asset contains nested reference to both a primary cryptographic NFT token corresponding to a digital AF1 shoe and a secondary cryptographic NFT token corresponding to a license to unlock a digital AF1 shoe for import into a select virtual platform. If the user 11 activates this feature to export the digital AF1 shoe into a third-party VG platform, the secondary NFT badge may be burnt when the AF1 shoe is exported; however, the primary shoe NFT remains active (lives on) and can continue to be traded, sold, etc.

With reference next to FIGS. 5-9, there are shown representative examples of systems, methods, and control logic for managing digital rights, such as governing the transfer of digital assets across heterogeneous digital platforms and/or selectively unlocking user rights for using, transferring, or modifying digital assets. As will be explained below, a digital asset—whether as a Web 2.0 VGOOD or as a Web 3.0 NFT (as described earlier)—may be generally typified by an asset content file and a set of digital use rights. The asset content file (BASE LAYER) may contain date code indicative of a digital image, an in-game asset, or other digital content that may be governed by a set of basic license rights. The digital use rights (RIGHTS LAYER) may contain on one or more use rights that delineate the manner in which asset content may be used. For instance, these digital use rights may contain unlock codes (TRANSFERRABLE CODES), which may be in the nature of NFT-embedded codes, database stored codes, user-redeemable codes, etc., that enable access to, modification of, and/or derivate creation from related asset content. As another option, the digital use rights may contain supplemental functionality data (ASSET ADDITIONS) that enable virtual goods, 3D files, and/or in-platform/game functionality of files embedded within third-party digital platforms and associated with separate license rights.

To facilitate users navigating between Web 2.0 technology VGOODS and Web 3.0 technology NFTs (both as described earlier), a digital rights management (DRM) framework enables a user to burn or disgorge an NFT, e.g., to enter a Web 2.0 corporate database with a digital asset associated with that NFT, and mint or obtain an NFT, e.g., to leave the Web 2.0 corporate database with a digital asset. With this framework, a corporate entity associated with the corporate database need not take custodial "possession" of the NFT, e.g., when a user wishes to return from Web 3.0 NFT to Web 2.0 VGOOD. To obviate illicit duplication or use of a digital asset and thereby maintain control over a total market volume of a given asset, the DRM framework may systematically track asset use, actively preclude asset duplication and, if desired, provide users access to view an asset's activity on Web 2.0 platforms, Web 3.0 platforms, and/or intermediary Web 2.5 middleware. A DRM framework may also make available for acquisition one or more asset additions, extra additional benefits, and/or options to "purchase up" enhanced benefits (e.g., when user buys NFT on secondary market) for a digital asset.

Centralization and decentralization are core factors that can impede or outright prevent user attempts to navigate back-and-forth between Web 2.0 digital platforms and Web 3.0 digital platforms. Application delivery, system resource services, and platform-to-platform interoperability on Web 2.0, for example, are typically governed and operated by centralized sources. In contradistinction, those same core functions are typically enabled on Web 3.0 through such features as decentralized blockchain recordation, peer-topeer consensus, and edge computing. To help avoid NFT-custody related issues and secondary marketplace considerations, disclosed DRM system frameworks may off-board web-to-web interoperability to a third-party liaison (e.g., middleware API) or a third-party intercessor (e.g., Web 2.5 intermediary) to facilitate exchanges between Web 2.0 and 3.0 platforms.

There are also innate challenges to reconcile activities conducted through a Web 3.0 digital crypto wallet that is associated with a Web 2.0 user account. By way of non-limiting example, a Web 3.0 digital crypto wallet may hold the private key to an NFT associated with a digital asset stored in a Web 2.0 database. A user may purchase and import the digital asset associated with that NFT to the user's Web 2.0 platform account. Once imported, the user may then export the asset to a destination (VG) platform or unlock use rights for using that asset or features associated therewith on the destination (VG) platform. The user may then sell the NFT and transfer the NFT out from their Web 3.0 wallet without the recipient of the NFT knowing the asset/asset use rights have already been expended. Consequently, the recipient of the NFT may be prevented from importing the associated digital asset to their own Web 2.0 platform account or to a video game partner that expressly limits use of any given asset to once on its platform.

To reconcile web-to-web transaction of a blockchain-secured token and its associated digital asset, the token may be configured as a nested NFTs with metadata restricting transfer of the NFT to anyone other than the current "custodian" of the associated digital asset (e.g., contains single-use badge for VG platform 1, a single-use badge for asset storage with corporate database, etc.). This may allow for Web 3.0 trading of NFTs while also enabling Web 2.0 account connects and reconciling 'uses' that are unlocked between discrete corporate entities. With this construct, the user is enabled to use the asset during regular play in a single or multiple VG platforms without having to run a secondary marketplace; a designated (origin) platform may act as a "home" node to which users return for "new" badges or to unlock assets with affiliated "walled garden" Web 2.0 partners. Additionally, a user may have a Web 3.0 digital crypto wallet that is connected to their Web 2.0 home platform account which is in turn connected to a third-party Web 2.0 platform.

Example systems, methods, and control logic for managing digital rights may include a host digital platform that provisions user accounts for transacting digital assets and communicatively connects via a distributed computing network with a destination VG platform and a blockchain service platform. The destination VG platform contains a collection of pre-programmed digital assets, and the blockchain service platform provisions custodial wallet services for non-fungible cryptographic tokens associated with digital assets. Through a personal computing device, a user submits an unlock request to access a digital asset (digital shoe) for use with a desired virtual platform, such as in a VG/AR/VR suite offered by a destination computing environment. The digital asset, if not already present, may be imported from a metadata-identified asset repository to a resident server of the host platform. Upon confirmation of the transfer request, the blockchain token associated with that asset is burned, and a respective asset record is created by the host platform, e.g., to guarantee that only one copy of the imported digital asset exists. If not already connected, the user may link their host platform account to a VG platform account assigned to the user.

Once the digital asset is present on the host platform and the user's host platform account is linked to their VG platform account, the host platform transmits an import request to transfer the digital asset to the VG platform. Import of the digital asset may concomitantly entail the host platform examining a predefined set of use rights associated with the digital asset to ascertain whether the user rights permit or preclude the requested transfer. In a first example, the digital asset may have been imported to the host server with an unlockable badge that, when unlocked, enables use of the digital asset or a comparable in-game asset during play in the VG suite. Responsive to receipt of the user-input transfer request, the host platform may retrieve the unlockable badge, unlock the badge, and transmit an unlock code contained therein to the VG platform. If the code is accepted, the VG platform may enable import of the digital asset or may unlock a comparable version of the asset retrieved from their collection of pre-programmed digital assets for in-game use.

In a second example, the host platform may determine that the digital asset was not imported with an unlockable badge; in this case, the host platform may offer the user with an option to purchase or otherwise acquire the badge necessary for completing the requested asset transfer. Once acquired by the user, the badge is unlocked, the unlock code is transmitted to the VG platform, and the VG platform imports the digital asset or unlocks the comparable asset. In either of the foregoing examples, the host platform may not transfer an asset content file (e.g., digital shoe image file) to the VG platform; rather, the "asset transfer" may solely entail the host platform transferring an unlock code to unlock a preexisting asset pre-programmed for use in the VG suite. As a further option, the destination VG platform may employ a dedicated digital asset API that uses the unlock code to access the associated asset content file and retrieve therefrom data indicative of characteristics of the user's digital asset. The asset API or a third-party vendor may use this data to build a comparable asset "on the fly" for in-game use.

After the digital asset or the corresponding unlock code is "imported" into the destination VG platform, the unlocked badge may be permanently deactivated (e.g., associated badge NFT is burned) so that the asset/unlock code cannot be re-imported by the user or a third party (e.g., without acquiring another badge). If a user wishes to transfer the digital asset (e.g., sell their digital shoe), they may export the digital asset from the host platform server to the blockchain service platform, which would concurrently mint a new NFT for the transferred asset. The new NFT may be created with a new unlockable badge as part of the asset attributes or, alternatively, an unlockable badge may be nest within the NFT metadata by reference. When the digital asset is exported and the NFT secured to a blockchain, the host platform may automatically remove the digital shoe from the user's account on the host platform server and, optionally, may solicit the VG platform to remove the digital asset/comparable asset from the user's VG platform account.

Turning to FIG. 5, there is presented an example of a blockchain-enabled digital asset 502 that is generally composed of: (1) an NFT 504 with embedded metadata; (2) a set of asset use (license) rights 506 that may contain at least one transferable unlock code; and (3) a base digital asset 508 that may be detailed in an asset content file. It should be appreciated that all three of these constituent parts of the blockchain-enabled digital asset 502 may be stored in a single location (e.g., on a blockchain) or may be stored in multiple discrete locations (e.g., on three independently operated platforms across Web 2.0 and 3.0). The asset use rights 506 may contain, among other things, a resale royalty restriction that defines a licensing fee to be paid back to the owner of the NFT 504 for each use of the base digital asset 508. The asset use rights 506 may also contain a Digital Collectible Agreement that defines, for example, the additional benefits for the NFT holder, such as transferable 3D files, unlockable features on partner platforms, access rights (e.g., forging physical products from digital asset, acquiring tickets to an event, etc.), and commercial rights for the user. A set of additional benefit licenses 514 may be created and associated with the digital asset 502 to define one or more use rights for each of the additional benefits.

FIG. 6 illustrates another example of a decentralized and distributed computing network 600 for transferring digital assets and/or user rights of digital assets across heterogeneous digital platforms. In this non-limiting example, the computing network 600 may be trifurcated into three interoperable segments: (1) a Web 3.0 platform 602 (e.g., decentralized computing environment; digital access rights system), (2) a Web 2.5 platform 604 (e.g., world-merging system that allows for conversion between VGOODS & NFTS for consumer choice and use of Web 2.0 and Web 3.0 enable virtual platforms), and (3) a Web 2.0 platform 606 (e.g., centralized computing environment for digital access rights system of which there is Web 2.1 and traditional Web 2.0, but both involve account connecting between "host" platform and "partner" platform). The Web 3.0 platform 602 contains a Web 3.0 digital wallet 608 with NFT-connect functionality to connect to and exchange blockchain-backed assets with a virtual world. A dedicated royalty engine 610 may actively track whether or not a predefined royalty rate has been paid prior to enabling use/transfer of an NFT contained in the digital wallet 608. It may be desired that the world-merging system, to help convert an NFT to a VGOOD, check if a royalty was paid on the NFT as it would need to be at the time of VGOOD conversion is requested.

Once cleared by the royalty engine 610, a partner platform virtual goods (PPVG) module 612 is operable to unlock virtual good files that are stored in and maintained by partner platforms. Alternatively, the royalty engine 610 of the Web 3.0 platform 602 may also enable an owner platform virtual goods (OPVG) module 614 to unlock virtual good files that are stored in and maintained by a server system of an owner of virtual goods. A virtual goods portal (VPG) module 616 may be enabled by the royalty engine 610 to unlock portals and concomitantly upload licensed virtual good files, e.g., to "bring into the world" a licensed file procured by an NFT owner from an owner of a digital asset or unlock from a file from within a decentralized web storage node to pull into a desired platform.

With continuing reference to FIG. 6, an intermediary (middleware) Web 2.5 platform 604 is functionality interposed between and arbitrates navigation back-and-forth across the Web 3.0 and Web 2.0 platforms 602, 606. The Web 2.5 platform 604 may employ a web-to-web merger engine 618 to bridge construct variances between a Web 2.0-based node and a Web 3.0-based node, e.g., to reconcile activities conducted through a Web 3.0 digital crypto wallet (e.g., NFT wallet 608) that is associated with a Web 2.0 member account (e.g., user account 626), and vice versa.) The Web 2.5 platform 604 may be an independent user-interface/user-experience (UI/UX) system that implements a blockchain-based decentralized application (dApp) tie 620 to bridge the divide between Web 2.0 and Web 3.0 through blockchain-facilitated applications (e.g., asset tokenization) while prioritizing user privacy and control.

The Web 2.0 platform 606 may include, in some non-limiting examples, a Web 2.1 module 622 that interacts with a Web 3.0 wallet connect module 624, which may provision communication and data exchanges between a Web 2.0-based host platform user account 626 and a Web 3.0-based digital wallet, e.g., as can be arbitrated by the Web 2.5 platform 604. In such a way a user can interact with a host platform without having to "convert" an NFT to a VGOOD, but still inform the host-platform of virtual assets held. This host platform user account 626 may be connected to a Web 2.0-based partner platform user account 628 to conduct any of the herein described asset/asset-right transfers. The line connecting the Web 3.0 wallet connect module 624 and the Web 2.0 host platform user account 626 may be designated as a "Web 2.1 connect", and the line connecting the Web 2.0 host platform user account 626 and the Web 2.0-based partner platform user account 628 may be designated as "Web 2.0 account connect". The Web 2.0 account connect is how the third party platform is informed by the host-platform what digital assets can be unlocked or used on the third party platform. In such a way the third-party platform is blinded to the user's version of digital assets they hold (e.g., a Web 2.0 VGOOD or a web 3.0 NFT.)

As noted above, a digital asset may be composed of an asset content file (e.g., base layer with digital image of a virtual good) and a set of digital use rights (e.g., base layer rights, unlockable badges, asset additions, asset addition rights, etc.). The digital asset may be secured on Web 3.0 by a single NFT (e.g., nested with embedded pointers to the asset content file and any attendant digital use rights) or multiple NFTs (one NFT for asset content file, one NFT for unlockable badge, one NFT for asset additions and rights, etc.). Alternatively, the digital asset may be secured by a Web 2.0 platform by a single VGOOD (e.g., with asset content file(s) and any attendant digital use rights, including one or more attendant badges) with pointers to storage on a host platform and/or a partner platform). A Web 2.5 intermediary platform may serve as an arbitrator (e.g., for DRM) to reconcile between activities occurring on Web 2.0 and Web. 3.0 involving a user and digital assets including, (1) activities involving Web 3.0 secondary marketplaces and/or Web 3.0-enabled partners; (2) activities involving a Web 2.0-enabled partners in conjunction with a host-platform user account (including any account connect between a user account of the Web 2.0 asset-retaining host and a Web 3.0 wallet (including a custodial wallet of Web 3.0-enabled custodial wallet partner if applicable).

For at least some DRM system frameworks, a Web 3.0 enabled platform (e.g., Web 3.0 platform 602 involving OPVG 614)) may retain a "NFT record" that is associated with a set of license rights to related content associated with a "base NFT." The NFT record may contain: (1) metadata that describes "traits" of the digital asset that can be selectively unlocked or modified; and/or (2) an association with an NFT-backed badge associated with the base NFT. To unlock the asset content or the license to related content of the NFT record (e.g., for Web 3.0 platform 602 utilizing modules PPVG 612, OPVG 614, and/or VGP 616), the aforementioned "traits" may be changed and/or the NFT-backed badge may be burnt. Similarly, a Web 2.0-based platform may retain an asset record database storing a respective record for each digital asset and a user rights database storing a respective set of use rights for each digital asset. To unlock one or more uses of the digital asset or one of the user rights (e.g., additional benefit) related to the digital asset, the user may be required to use a corresponding "ticket." (which can also be in the visual form of a badge.)

If the user wishes to navigate between the Web 2.0-based and Web 3.0-based platforms, they may be required to mint/burn an NFT for that functionality.

FIG. 7 illustrates a representative system framework 700 that enables a user to choose, move between, and/or interact with both a Web2.0 ecosystem 704 and a Web3.0 ecosystem 702. In this example, the Web3.0 ecosystem 702 contains a Web3.0 digital asset collection (DAC) 706 with attendant digital asset management (DAM) software for managing access, use, and sharing of the contents in the Web3.0 DAC 706. In the same vein, the Web2.0 ecosystem 704 contains a Web2.0 DAC 708 with attendant DAM software for managing access, use, and sharing of the contents in the Web2.0 DAC 708. To interact with Web3.0 ecosystem 702, a decentralized and consumer-controlled digital asset, such as an NFT 714, is functionally "maintained" in a consumer-controlled digital wallet, such as digital wallet 710 (e.g., this can be a custodial digital wallet or self-sovereign digital wallet.) To interact with Web 2.0 ecosystem 702, a centralized and company-controlled asset, such as a virtual good 716, is functionally maintained by a host company ("behind walls") and associated with an end-user account, such as member account 712. The NFT 714 of FIG. 7 may be configured as a nested NFT or may be associated with a nested NFT (e.g., via a pointer in the metadata of the nested NFT). Moreover, the virtual good 716 may be associated with one or more VGOOD badges, non-limiting examples of which are described above with respect to FIG. 4.

Web3.0 ecosystem 702 of FIG. 7 may be embodied as a Web 3.0-enabled virtual platform (VP) that establishes a wallet connect between the Web 3.0 platform and the digital wallet 710, including any NFTs 714 stored in that wallet 710. Web2.0 ecosystem 704 of FIG. 7 may be embodied as a Web 2.0-enabled virtual platform that establishes an account connect between the Web 2.0 platform and the member account 712, including any virtual goods 716 stored in that account 712. Web2.5 intermediary platform 718 may operate in conjunction with a Web2.5 digital asset repository (DAR) and user license agreement (ULA) database 720 through an API 722 to bridge wallet and account interoperability across the Web 2.0 and Web 3.0-based nodes. With this framework, the user may choose to configure the asset's use rights in a blockchain-enabled asset format of an NFT (e.g., to allow for secondary trading and/or for use in Web 3.0-enabled VPs). Alternatively, the user may choose to configure the asset's use rights in a centralized asset format of a VGOOD (e.g., to allow for account linking and use in Web 2.0-enabled VPs).

Presented in FIG. 8 is a representative decentralized and distributed computing network 800 for transferring a digital asset and/or a set of user rights associated with a digital asset across heterogeneous digital platforms that incorporates a third-party partner that provides custodial digital wallet services to users. As described above, the computing network 800 of FIG. 8 may be composed of one or more host (first) digital platforms 802, such as a VGOODS Web 2.0 centralized computing digital platform, that is/are communicatively connected via a distributed computing network (e.g., network 30 of FIG. 2) with one or more partner VP (second) digital platforms 804, such as a desired VG/AR/VR suite, and one or more blockchain-enabled services (third) platforms 806, such as a custodial wallet platform partner for users to hold NFTs 820 in custodial wallets and any other associated blockchain-enabled services. One or more digital asset APIs 808 may facilitate any of the herein described communications and/or transfers between the other various platform nodes interconnected on the computing network

800. Each host (VGOODS) digital platform 802 may contain a digital asset repository (DAR) 810 and a user license agreement (ULA) database 812. Each partner (VP) platform 804 may contain a video game suite (VGS) 814 and a digital asset collection (DAC) 816. Blockchain enabled services platforms 806 may include decentralized cloud storage, such an interplanetary file system (IPFS) 818, and a custodial wallet services for NFTs 820. For at least some applications, the host platform(s) 802 and partner platform(s) 804 are Web 2.0 nodes, whereas the blockchain platform(s) 806 are Web 3.0 nodes and the digital asset API(s) 808 may be Web 2.5 nodes.

A framework may be utilized whereby decentralized storage of content files is utilized, irrespective of a VGOOD or NFT being the format for digital asset tracking. Upon receipt of a user-input transfer request via the host platform 802 to import/export a digital asset and/or a user right associated therewith (either via related VGOOD or NFT user ownership) an unlock code for access rights or an asset content file (e.g., a 3D model of a digital shoe) may be transferred directly from the IPFS 818 of blockchain enabled services platform 806 to the VP platform 804 for use in the video game suite VGS 814. Alternatively, the asset content file or unlock code may be transferred from the IPFS 818 of the blockchain enabled services platform 806 to the API 808; at this juncture, the API 808 generates a derivative model (utilizing generative AI or a myriad of spatial computing enabled services) from select contents of the asset content file and transfers the derivative model to the VG platform 804 for use in the video game suite VGS 814. As another option, the host platform 802 may retrieve the subject digital asset from the IPFS 818 of the blockchain enabled services platform 806 and then store the retrieved asset in the digital asset repository DAR 810 of VP platform 802. As explained above, the host platform 802 then retrieves an unlockable badge from the digital asset and, when unlocked, transfers an unlock code contained within the badge to the VG platform 804, e.g., to unlock a game skin or other in-game asset associated with the unlock code, stored in DAC 816. Any combination of storage of digital assets across the platforms can be utilized for access and "unlocking" utilizing APIs and other communication services between platforms and networks, including the world merging technologies described earlier.

FIG. 9 illustrates a pair of users—an athlete 902 and a musician 904—that are exchanging and unlocking virtual goods for use on video game platform. In this illustrated example, the athlete 902 and the musician are wearing respective CTMK or friendship bracelets 906 and 908 that are compatible with each other for exchanging a virtual good. The first friendship bracelet 906 of may have a physical "in real life" (iRL) component and a digital component. The athlete 902 may use the friendship bracelet 906 to transmit an offer to a wireless-enabled, handheld computing device 910 of the musician 904 to unlock a virtual good (e.g., an avatar skin) for use in a video game suite (e.g., King of Thieves). FIG. 9 illustrates a user's ability to unlock a centralized digital asset (VGOOD) or a blockchain-enabled asset (NFT) using a physical item (bracelet). The user is then able to connect to a Web 2.0-enbled virtual platform and unlock a use right associated with the digital asset on the Web 2.0-enbled VP (e.g., play as "Virtual Taylor" in a rock band video game, play as "Virtual Travis" in an American football video game, etc.). Use of the digital asset in this manner may then unlock an "additional benefit" reward, such as a VIP ticket to watch the Taylor in Real Life (IRL) concert.

With continuing reference to FIG. 9, a real-life football player may buy a physical friendship bracelet; the physical friendship bracelet then unlocks a digital version of the bracelet. When the football player receives the collectible digital version of the bracelet, he is provided with an additional benefit of unlocking a musician avatar that will help aid in winning a corresponding video game, such as King of Thieves. The musician avatar may even be wearing a digital friendship bracelet matching the one the football player purchased! When playing the video game as the musician avatar, the football player may be rewarded with a surprise unlock reward of box tickets to the real-life musician's next concert (e.g., playing the same weekend he is playing a football game in the same city!). FIG. 9 may be considered an example of how a user can use a physical product to unlock a digital asset, and then the digital asset to unlock another digital asset (VP unlocks), and then playing a game on the VP unlocks a digital reward that is about a physical iRL experience that relates to the VP experience. Interconnected physical and digital experiences through heterogenous digital platforms and technologies can provide for next level community engagement and connectiveness that take relationships to the next level-between community members, fans, and creators.

Aspects of this disclosure may be implemented, for example, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input(s). The software may also cooperate with other code segments to initiate a variety of tasks in response to data received in conjunction with the source of the received data. The software may be stored on any of a variety of memory media, such as CD-ROM, magnetic disk, solid-state drive (SSD), hard-disk drive (HDD), and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

As noted in the disclosure, the present system may utilize public or private blockchain infrastructures, distributed ledgers, append-only databases, and the like. In one example, the presently described cryptographically secured digital assets may initially be stored/secured to a private blockchain that resides on infrastructure maintained by a single entity, or consortium of entities. Each entity may agree upon a common form, or data construct for the infrastructure, though assets of any one entity may be maintained by that entity. Such a model may provide for the sharing of network and infrastructure costs/resources, while permitting each entity to maintain their own asset independence. To further public trust, assets created on this private or semi-private blockchain may be transferrable to public chains at the discretion of the user (potentially subject to one or more conditions of transfer).

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a solid-state drive (SSD) device, a hard-disk drive (HDD) device, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Additional features and options of this disclosure may be reflected in the following clauses:

Clause 1: a method for controlling transfer of digital assets, the method comprising: storing, in a first memory device of a first digital platform, a first digital asset having a fungible digital construct and thereby associate the first digital asset with a first user account of a first user; receiving, via a server computer of the first digital platform from the first user, a first transfer request to transfer the first digital asset to a second digital platform; converting, via the server computer responsive to receiving the first transfer request, the first digital asset to a second digital asset having a non-fungible digital construct, the converting including generating a cryptographic (crypto) token, assigning the crypto token to the second digital asset, and recording the crypto token on a transaction block of a blockchain; transferring, via the server computer over a distributed computing network, the second digital asset from the first digital platform to an intermediate computing node and thereby associate the second digital asset with a second user account of the first user; and transferring the second digital asset from the intermediate computing node to the second digital platform and thereby associate the second digital asset with a third user account of the first user.

Clause 2: the method of clause 1, further comprising closing, via the server computer responsive to transferring the second digital asset to the intermediate computing node, the first user account on the first digital platform.

Clause 3: the method of clause 1, further comprising removing, via the server computer responsive to transferring the second digital asset to the intermediate computing node, the first digital asset from the first memory device of the first digital platform.

Clause 4: the method of clause 1, wherein the intermediate computing node includes a digital wallet platform and the second user account includes a digital crypto wallet.

Clause 5: the method of clause 4, wherein the digital crypto wallet is a self-sovereign identity (SSI) digital wallet operating via a software application connected to an encrypted database storing a set of user credentials and keys indicative of a self-sovereign identity of the first user.

Clause 6: the method of clause 1, further comprising: receiving, via the server computer of the first digital platform, a second transfer request to transfer the second digital asset to the first digital platform; converting, via the server computer responsive to receiving the second transfer request, the second digital asset to the first digital asset having the fungible digital construct, the converting including burning the crypto token assigned to the second digital asset; and receiving, via the server computer over the distributed computing network, the second digital asset from the second digital platform or the intermediate computing node.

Clause 7: the method of clause 6, wherein burning the crypto token includes sending the crypto token to an inaccessible digital wallet or an un-spendable blockchain address.

Clause 8: the method of clause 1, wherein the intermediate computing node includes a Web 2.5 intermediary platform operable to arbitrate transfer of the first digital asset between the first and second digital platforms.

Clause 9: the method of clause 8, further comprising: determining, via an intermediary server computer of the Web 2.5 intermediary platform, if the first transfer request complies with a first rule set predefined by the first digital platform, wherein transferring the first digital asset from the intermediate computing node to the second digital platform is responsive to determining the first transfer request complies with the first rule set.

Clause 10: the method of clause 9, further comprising: determining, via the intermediary server computer of the intermediate computing node, if the first transfer request complies with a second rule set predefined by the second digital platform, wherein transferring the first digital asset from the intermediate computing node to the second digital platform is further in response to determining the first transfer request complies with the second rule set.

Clause 11: the method of clause 1, wherein the first digital platform includes a hybridized Web 2.5 virtual goods platform and the first digital asset includes an intangible virtual good.

Clause 12: the method of clause 11, wherein the second digital platform is a Web 2.0 or 3.0 online gaming platform.

Clause 13: the method of clause 12, wherein the second digital platform includes a video game (VG) environment, a virtual reality (VR) environment, and/or an augmented reality (AR) environment.

Clause 14: a decentralized computing system for transferring digital assets, the decentralized computing system comprising: a server database provisioning a first digital platform; a communications device configured to connect the first digital platform with a second digital platform via an intermediate computing node over a distributed computing network; and a server computer operatively connected to the server database and the communications device, the server computer being programmed to: store a first digital asset having a fungible digital construct in a first memory device of the first digital platform and thereby associate the first digital asset with a first user account of a first user; receive a first transfer request from the first user to transfer the first digital asset to the second digital platform; responsive to receiving the first transfer request, convert the first digital asset to a second digital asset having a non-fungible digital construct, the converting including generating a cryptographic (crypto) token, assigning the crypto token to the second digital asset, and recording the crypto token on a transaction block of a blockchain; transfer the second digital asset from the first digital platform to the intermediate computing node via the communications device and thereby associate the second digital asset with a second user account of the first user; and request transfer of the second digital asset from the intermediate computing node to the second digital platform and thereby associate the second digital asset with a third user account of the first user.

Clause 15: a non-transitory computer-readable medium storing instructions executable by one or more processors of a controller of a computing system, the instructions, when executed by the one or more processors, causing the controller to perform operations comprising: storing, in a first memory device of a first digital platform, a first digital asset having a fungible digital construct and thereby associate the first digital asset with a first user account of a first user; receiving, from the first user, a first transfer request to transfer the first digital asset to a second digital platform; converting, responsive to receiving the first transfer request, the first digital asset to a second digital asset having a non-fungible digital construct, the converting including generating a cryptographic (crypto) token, assigning the crypto token to the second digital asset, and recording the crypto token on a transaction block of a blockchain; transferring, over a distributed computing network, the second digital asset from the first digital platform to an intermediate computing node and thereby associate the second digital asset with a second user account of the first user; and requesting transfer of the second digital asset from the intermediate computing node to the second digital platform and thereby associate the second digital asset with a third user account of the first user.

Clause 16: the computer-readable medium of clause 15, wherein the instructions further cause the controller to close, responsive to transferring the second digital asset to the intermediate computing node, the first user account on the first digital platform.

Clause 17: computer-readable medium of clause 15, wherein the instructions further cause the controller to remove, responsive to transferring the second digital asset to the intermediate computing node, the first digital asset from the first memory device of the first digital platform.

Clause 18: the computer-readable medium of clause 15, wherein the intermediate computing node includes a digital wallet platform and the second user account includes a digital crypto wallet.

Clause 19: the computer-readable medium of clause 18, wherein the digital crypto wallet is a self-sovereign identity (SSI) digital wallet operating via a software application connected to an encrypted database storing a set of user credentials and keys indicative of a self-sovereign identity of the first user.

Clause 20: the computer-readable medium of clause 15, wherein the instructions further cause the controller to: receive a second transfer request to transfer the second digital asset to the first digital platform; responsive to receiving the second transfer request, convert the second digital asset to the first digital asset having the fungible digital construct, the converting including burning the crypto token assigned to the second digital asset; and receive the second digital asset from the second digital platform over the distributed computing network.

Clause 21: the computer-readable medium of clause 20, wherein burning the crypto token includes sending the crypto token to an inaccessible digital wallet or an un-spendable blockchain address.

Clause 22: the computer-readable medium of clause 15, wherein the intermediate computing node includes a Web 2.5 intermediary platform operable to arbitrate transfer of the first digital asset between the first and second digital platforms.

Clause 23: the computer-readable medium of clause 22, wherein the instructions further cause the controller to: receive, from an intermediary server computer of the intermediate computing node, an indication that the first transfer request complies with a first rule set predefined by the first digital platform, wherein transferring the first digital asset from the intermediate computing node to the second digital platform is responsive to determining the first transfer request complies with the first rule set.

Clause 24: the computer-readable medium of clause 23, wherein the instructions further cause the controller to: receive, from the intermediary server computer, an indication that the first transfer request complies with a second rule set predefined by the second digital platform, wherein transferring the first digital asset from the intermediate computing node to the second digital platform is further in response to determining the first transfer request complies with the second rule set.

Clause 25: the computer-readable medium of clause 15, wherein the first digital platform includes a hybrid centralized and decentralized Web 2.5 virtual goods platform and the first digital asset includes an intangible virtual good.

Clause 26: the computer-readable medium of clause 25, wherein the second digital platform is a Web 2.0 or 3.0 online gaming platform.

Clause 27: the computer-readable medium of clause 26, wherein the second digital platform includes a video game (VG) environment, a virtual reality (VR) environment, and/or an augmented reality (AR) environment.

Clause 28: a method for managing digital rights of digital assets, the method comprising: retrieving, from a memory device of a first digital platform, a digital asset having associated therewith an asset content file and a set of digital use rights; receiving, via a server computer of the first digital platform from a computing device of a user, a transfer request to export the asset content file of the digital asset or a derivation of the asset content file to a second digital platform; creating, responsive to receiving the transport request from the user, a non-fungible cryptographic (crypto) token for the digital asset, the creating including recording the crypto token on a transaction block of a blockchain and storing the crypto token in a digital wallet maintained by a digital wallet platform distinct from the first digital platform; and transferring, over a distributed computing network after creating the crypto token, the asset content file or the derivation of the asset content file from the first digital platform to the second digital platform based on one or more use rights in the set of digital use rights.

Clause 29: a method for managing digital rights of digital assets, the method comprising: receiving, via a server computer of a first digital platform from a computing device of a user, a transfer request to import a digital asset from a second digital platform to the first digital platform, the digital asset having associated therewith a set of digital use rights and an asset content file; retrieving, from a digital wallet maintained by a digital wallet platform distinct from the first digital platform, a non-fungible cryptographic (crypto) token associated with the digital asset and recorded on a transaction block of a blockchain; destroying, responsive to receiving the transport request to import the digital asset, the crypto token of the digital asset; and transferring, over a distributed computing network after destroying the crypto token, the digital asset from the second digital platform to the first digital platform based on one or more use rights in the set of digital use rights.

Clause 30: a method for managing digital rights of digital assets, the method comprising: receiving, via a server computer of a first digital platform from a computing device of a user, a transfer request to export a digital asset from a file repository system to a second digital platform, the digital asset having associated therewith a set of digital use rights and an asset content file; retrieving, from a digital wallet maintained by a digital wallet platform distinct from the first digital platform, a non-fungible cryptographic (crypto) token associated with the digital asset and recorded on a transaction block of a blockchain; destroying, responsive to receiving the transport request to export the digital asset, the crypto token of the digital asset; and transferring, over a distributed computing network after destroying the crypto token, the asset content file or a derivation of the asset content file of the digital asset to the second digital platform based on one or more use rights in the set of digital use rights.

Clause 31: a method for managing digital rights of digital assets, the method comprising: importing, to a first digital platform over a distributed computing network, a digital asset having associated therewith a set of digital use rights and an asset content file; destroying, responsive to importing the digital asset, a non-fungible cryptographic (crypto) token associated with the digital asset and recorded on a transaction block of a blockchain; associating, via a server computer of the first digital platform, a user account of a user to a digital asset record created on the first digital platform for the digital asset; linking the user account to a video game (VG) suite provisioned on a second digital platform; activating, via the server computer, an asset badge containing an unlock code enabling access to one or more use rights in the set of digital use rights of the digital asset; and transmitting, from the first digital platform to the second digital platform over the distributed computing network, the unlock code to thereby enable the user to access a VG asset associated with the digital asset in the VG suite.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

Embodiments of the present disclosure are provided in the following enumerated clauses, which should be read in light of the preceding disclosure and explanation of the technology.

Clause 1: A method for controlling transfer of digital assets, the method comprising: storing, in a first memory device of a first digital platform, a first digital asset having a fungible digital construct and thereby associate the first digital asset with a first user account of a first user; receiving, via a server computer of the first digital platform from the first user, a first transfer request to transfer the first digital asset to a second digital platform; converting, via the server computer responsive to receiving the first transfer request, the first digital asset to a second digital asset having a non-fungible digital construct, the converting including generating a cryptographic (crypto) token, assigning the crypto token to the second digital asset, and recording the crypto token on a transaction block of a blockchain; transferring, via the server computer over a distributed computing network, the second digital asset from the first digital platform to an intermediate computing node and thereby associate the second digital asset with a second user account of the first user; and transferring the second digital asset from the intermediate computing node to the second digital platform and thereby associate the second digital asset with a third user account of the first user.

Clause 2: The method of clause 1, further comprising closing, via the server computer responsive to transferring the second digital asset to the intermediate computing node, the first user account on the first digital platform.

Clause 3: The method of clause 1, further comprising removing, via the server computer responsive to transferring the second digital asset to the intermediate computing node, the first digital asset from the first memory device of the first digital platform.

Clause 4: The method of clause 1, wherein the intermediate computing node includes a digital wallet platform and the second user account includes a digital crypto wallet.

Clause 5: The method of clause 4, wherein the digital crypto wallet is a self-sovereign identity (SSI) digital wallet operating via a software application connected to an encrypted database storing a set of user credentials and keys indicative of a self-sovereign identity of the first user.

Clause 6: The method of clause 1, further comprising: receiving, via the server computer of the first digital platform, a second transfer request to transfer the second digital asset to the first digital platform; converting, via the server computer responsive to receiving the second transfer request, the second digital asset to the first digital asset having the fungible digital construct, the converting including burning the crypto token assigned to the second digital asset; and receiving, via the server computer over the distributed computing network, the second digital asset from the second digital platform or the intermediate computing node.

Clause 7: The method of clause 6, wherein burning the crypto token includes sending the crypto token to an inaccessible digital wallet or an un-spendable blockchain address.

Clause 8: The method of clause 1, wherein the intermediate computing node includes a Web 2.5 intermediary platform operable to arbitrate transfer of the first digital asset between the first and second digital platforms.

Clause 9: The method of clause 8, further comprising: determining, via an intermediary server computer of the Web 2.5 intermediary platform, if the first transfer request complies with a first rule set predefined by the first digital platform, wherein transferring the first digital asset from the intermediate computing node to the second digital platform is responsive to determining the first transfer request complies with the first rule set.

Clause 10: The method of clause 9, further comprising: determining, via the intermediary server computer of the intermediate computing node, if the first transfer request complies with a second rule set predefined by the second digital platform, wherein transferring the first digital asset from the intermediate computing node to the second digital platform is further in response to determining the first transfer request complies with the second rule set.

Clause 11: The method of clause 1, wherein the first digital platform includes a hybridized Web 2.5 virtual goods platform and the first digital asset includes an intangible virtual good.

Clause 12: The method of clause 11, wherein the second digital platform is a Web 2.0 or 3.0 online gaming platform.

Clause 13: The method of clause 12, wherein the second digital platform includes a video game (VG) environment, a virtual reality (VR) environment, and/or an augmented reality (AR) environment.

Clause 14: A decentralized computing system for transferring digital assets, the decentralized computing system comprising: a server database provisioning a first digital platform; a communications device configured to connect the first digital platform with a second digital platform via an intermediate computing node over a distributed computing network; and a server computer operatively connected to the server database and the communications device, the server computer being programmed to: store a first digital asset having a fungible digital construct in a first memory device of the first digital platform and thereby associate the first digital asset with a first user account of a first user; receive a first transfer request from the first user to transfer the first digital asset to the second digital platform; responsive to receiving the first transfer request, convert the first digital asset to a second digital asset having a non-fungible digital construct, the converting including generating a cryptographic (crypto) token, assigning the crypto token to the second digital asset, and recording the crypto token on a transaction block of a blockchain; transfer the second digital asset from the first digital platform to the intermediate computing node via the communications device and thereby associate the second digital asset with a second user account of the first user; and request transfer of the second digital asset from the intermediate computing node to the second digital platform and thereby associate the second digital asset with a third user account of the first user.

Clause 15: A non-transitory computer-readable medium storing instructions executable by one or more processors of a controller of a computing system, the instructions, when executed by the one or more processors, causing the controller to perform operations comprising: storing, in a first memory device of a first digital platform, a first digital asset having a fungible digital construct and thereby associate the first digital asset with a first user account of a first user; receiving, from the first user, a first transfer request to transfer the first digital asset to a second digital platform; converting, responsive to receiving the first transfer request, the first digital asset to a second digital asset having a non-fungible digital construct, the converting including generating a cryptographic (crypto) token, assigning the crypto token to the second digital asset, and recording the crypto token on a transaction block of a blockchain; transferring, over a distributed computing network, the second digital asset from the first digital platform to an intermediate computing node and thereby associate the second digital asset with a second user account of the first user; and requesting transfer of the second digital asset from the intermediate computing node to the second digital platform and thereby associate the second digital asset with a third user account of the first user.

Clause 16: The computer-readable medium of clause 15, wherein the instructions further cause the controller to close, responsive to transferring the second digital asset to the intermediate computing node, the first user account on the first digital platform.

Clause 17: The computer-readable medium of clause 15, wherein the instructions further cause the controller to remove, responsive to transferring the second digital asset to the intermediate computing node, the first digital asset from the first memory device of the first digital platform.

Clause 18: The computer-readable medium of clause 15, wherein the intermediate computing node includes a digital wallet platform and the second user account includes a digital crypto wallet.

Clause 19: The computer-readable medium of clause 18, wherein the digital crypto wallet is a self-sovereign identity (SSI) digital wallet operating via a software application connected to an encrypted database storing a set of user credentials and keys indicative of a self-sovereign identity of the first user.

Clause 20: The computer-readable medium of clause 15, wherein the instructions further cause the controller to: receive a second transfer request to transfer the second digital asset to the first digital platform; responsive to receiving the second transfer request, convert the second digital asset to the first digital asset having the fungible digital construct, the converting including burning the crypto token assigned to the second digital asset; and receive the second digital asset from the second digital platform over the distributed computing network.

Clause 21: The computer-readable medium of clause 20, wherein burning the crypto token includes sending the crypto token to an inaccessible digital wallet or an un-spendable blockchain address.

Clause 22: The computer-readable medium of clause 15, wherein the intermediate computing node includes a Web 2.5 intermediary platform operable to arbitrate transfer of the first digital asset between the first and second digital platforms.

Clause 23: The computer-readable medium of clause 22, wherein the instructions further cause the controller to: receive, from an intermediary server computer of the intermediate computing node, an indication that the first transfer request complies with a first rule set predefined by the first digital platform, wherein transferring the first digital asset from the intermediate computing node to the second digital platform is responsive to determining the first transfer request complies with the first rule set.

Clause 24: The computer-readable medium of clause 23, wherein the instructions further cause the controller to: receive, from the intermediary server computer, an indication that the first transfer request complies with a second rule set predefined by the second digital platform, wherein transferring the first digital asset from the intermediate computing node to the second digital platform is further in response to determining the first transfer request complies with the second rule set.

Clause 25: The computer-readable medium of clause 15, wherein the first digital platform includes a hybrid centralized and decentralized Web 2.5 virtual goods platform and the first digital asset includes an intangible virtual good.

Clause 26: The computer-readable medium of clause 25, wherein the second digital platform is a Web 2.0 or 3.0 online gaming platform.

Clause 27: The computer-readable medium of clause 26, wherein the second digital platform includes a video game (VG) environment, a virtual reality (VR) environment, and/or an augmented reality (AR) environment.

Clause 28: A method for managing digital rights of digital assets, the method comprising: retrieving, from a memory device of a first digital platform, a digital asset having associated therewith an asset content file and a set of digital use rights; receiving, via a server computer of the first digital platform from a computing device of a user, a transfer request to export the asset content file of the digital asset or a derivation of the asset content file to a second digital platform; creating, responsive to receiving the transport request from the user, a non-fungible cryptographic (crypto) token for the digital asset, the creating including recording the crypto token on a transaction block of a blockchain and storing the crypto token in a digital wallet maintained by a digital wallet platform distinct from the first digital platform; and transferring, over a distributed computing network after creating the crypto token, the asset content file or the derivation of the asset content file from the first digital platform to the second digital platform based on one or more use rights in the set of digital use rights.

Clause 29: A method for managing digital rights of digital assets, the method comprising: receiving, via a server computer of a first digital platform from a computing device of a user, a transfer request to import a digital asset from a second digital platform to the first digital platform, the digital asset having associated therewith a set of digital use rights and an asset content file; retrieving, from a digital wallet maintained by a digital wallet platform distinct from the first digital platform, a non-fungible cryptographic (crypto) token associated with the digital asset and recorded on a transaction block of a blockchain; destroying, responsive to receiving the transport request to import the digital asset, the crypto token of the digital asset; and transferring, over a distributed computing network after destroying the crypto token, the digital asset from the second digital platform to the first digital platform based on one or more use rights in the set of digital use rights.

Clause 30: A method for managing digital rights of digital assets, the method comprising: receiving, via a server computer of a first digital platform from a computing device of a user, a transfer request to export a digital asset from a file repository system to a second digital platform, the digital asset having associated therewith a set of digital use rights and an asset content file; retrieving, from a digital wallet maintained by a digital wallet platform distinct from the first digital platform, a non-fungible cryptographic (crypto) token associated with the digital asset and recorded on a transaction block of a blockchain; destroying, responsive to receiving the transport request to export the digital asset, the crypto token of the digital asset; and transferring, over a distributed computing network after destroying the crypto token, the asset content file or a derivation of the asset content file of the digital asset to the second digital platform based on one or more use rights in the set of digital use rights.

Clause 31. A method for managing digital rights of digital assets, the method comprising: importing, to a first digital platform over a distributed computing network, a digital asset having associated therewith a set of digital use rights and an asset content file; destroying, responsive to importing the digital asset, a non-fungible cryptographic (crypto) token associated with the digital asset and recorded on a transaction block of a blockchain; associating, via a server computer of the first digital platform, a user account of a user to a digital asset record created on the first digital platform for the digital asset; linking the user account to a video game (VG) suite provisioned on a second digital platform; activating, via the server computer, an asset badge containing an unlock code enabling access to one or more use rights in the set of digital use rights of the digital asset; and transmitting, from the first digital platform to the second digital platform over the distributed computing network, the unlock code to thereby enable the user to access a VG asset associated with the digital asset in the VG suite.

What is claimed is:

1. A system for managing digital assets across heterogeneous virtual platforms, the system comprising:

a server computer of an intermediary platform, the server computer configured to:

maintain a plurality of user accounts, wherein each user account is associated with at least one fungible digital asset on a first digital platform, wherein the first digital platform is a centralized platform where digital assets are not recorded on a blockchain and are not freely transferable from the first digital platform;

receive, from a first user account of the plurality of user accounts, a transfer request to transfer a first fungible digital asset to a second digital platform, wherein the second digital platform is a decentralized platform where digital assets are recorded on a blockchain and are freely transferable from or within the second digital platform;

in response to receiving the transfer request:

verify compliance with a first rule set established by the first digital platform and a second rule set established by the second digital platform, generate or cause the generation of a first non-fungible
token (NFT) corresponding to the first fungible digital
asset, wherein the first NFT is recorded on a block-
chain, and remove or disable the first fungible digital asset from the
first user account; and transfer, or cause the transfer of, the first NFT to a digital
wallet associated with the first user account, wherein
the intermediary platform does not take custodial pos-
session of the first NFT.

2. The system of claim 1, wherein the server computer is
further configured to:

enable the first user account to be linked to a user account
on a partner platform;

verify the first user account's ownership or right to use the
first fungible digital asset;

generate an unlock code associated with the first fungible
digital asset; and transmit the unlock code to the partner platform, wherein
the partner platform, upon receiving the unlock code,
grants access to a corresponding digital asset within the
partner platform's system.

3. The system of claim 2, wherein the server computer is
further configured to:

maintain a one-time use rights management system for
managing one-time use rights across platforms;

associate the unlock code with a one-time use indicator;
and deactivate the one-time use indicator after transmitting the
unlock code.

4. The system of claim 1, wherein the digital wallet is a
self-sovereign identity (SSI) digital wallet operating via a
software application connected to an encrypted database
storing user credentials.

5. The system of claim 1, wherein the server computer is
further configured to:

receive, from a second user account, a second transfer
request to transfer a second NFT to the first digital
platform, wherein the second NFT was recorded on a
blockchain;

verify ownership of the second NFT via the blockchain;

cause the burning or sidelining of the second NFT; and create or reinstate a second fungible digital asset in the
second user account on the first digital platform.

6. The system of claim 5, wherein burning the second
NFT comprises sending the second NFT to an inaccessible
digital wallet or an un-spendable blockchain address.

7. The system of claim 1, wherein the first digital platform
is a virtual goods platform.

8. A method for transferring digital assets between plat-
forms, the method comprising:

receiving, by a server computer of an intermediary plat-
form, a transfer request from a first user account to
transfer a first fungible digital asset from a centralized
platform to a decentralized platform, wherein:

the centralized platform maintains digital assets that are
not recorded on a blockchain and are not freely trans-
ferable from the centralized platform, and the decentralized platform maintains digital assets that are
recorded on a blockchain and are transferable from or
within the decentralized platform;

in response to receiving the transfer request:

verifying, by the server computer, compliance with rule
sets established by both the centralized platform and
the decentralized platform;

generating, or causing the generation of, a first non-
fungible token (NFT) corresponding to the first fun-
gible digital asset;

recording the first NFT on a blockchain, and transferring, or causing the transfer of, the first NFT to a
digital wallet associated with the first user account,
wherein the intermediary platform does not take cus-
todial possession of the first NFT.

9. The method of claim 8, further comprising:

enabling the first user account to be linked to a user
account on a partner platform;

verifying the first user account's ownership or right to use
the first fungible digital asset;

generating an unlock code associated with the first fun-
gible digital asset; and transmitting the unlock code to the partner platform,
wherein the partner platform, upon receiving the
unlock code, grants access to a corresponding digital
asset within the partner platform's system.

10. The method of claim 9, further comprising:

maintaining a one-time use rights management system for
managing one-time use rights across platforms;

associating the unlock code with a one-time use indicator;
and deactivating the one-time use indicator after transmitting
the unlock code.

11. The method of claim 8, wherein the digital wallet is a
self-sovereign identity (SSI) digital wallet.

12. The method of claim 8, wherein the centralized
platform is a virtual goods platform.

13. A method for transferring digital assets between
platforms, the method comprising:

receiving, by a server computer of an intermediary plat-
form, a transfer request from a first user account to
transfer a first non-fungible token (NFT) from a decen-
tralized platform to a centralized platform, wherein:

the decentralized platform maintains digital assets that are
recorded on a blockchain and are transferable from or
within the decentralized platform, the centralized platform maintains digital assets that are
not recorded on a blockchain and are not freely trans-
ferable from the centralized platform, and the first NFT corresponds to a first fungible digital asset;

verifying, by the server computer:

ownership of the first NFT via the blockchain, and compliance with rule sets established by both the decen-
tralized platform and the centralized platform;

in response to verifying ownership and compliance:

causing the burning or sidelining of the first NFT, and creating or reinstating the first fungible digital asset in the
first user account on the centralized platform.

14. The method of claim 13, wherein burning the first
NFT comprises sending the first NFT to an inaccessible
digital wallet or an un-spendable blockchain address.

15. The method of claim 13, wherein sidelining the first
NFT comprises transferring the first NFT to a digital wallet
controlled by an administrator of the centralized platform or
decentralized platform.

16. The method of claim 13, further comprising:

enabling the first user account to be linked to a user
account on a partner platform;

verifying the first user account's ownership or right to use
the first fungible digital asset;

generating an unlock code associated with the first fun-
gible digital asset; and transmitting the unlock code to the partner platform,
wherein the partner platform, upon receiving the unlock code, grants access to a corresponding digital asset within the partner platform's system.

17. The method of claim 16, further comprising:

maintaining a one-time use rights management system for managing one-time use rights across platforms;

associating the unlock code with a one-time use indicator; and deactivating the one-time use indicator after transmitting the unlock code.

18. The method of claim 13, wherein the centralized platform is a virtual goods platform.

19. The method of claim 13, further comprising:

storing the first fungible digital asset in association with metadata that defines one or more characteristics of the first fungible digital asset; and maintaining synchronization between the metadata and corresponding NFT attributes recorded on the blockchain.

20. The method of claim 13, further comprising:

tracking usage of the first fungible digital asset across multiple platforms; and preventing concurrent use of the first fungible digital asset and the first NFT.

\* \* \* \* \*